United States Patent [19]
Rivette et al.

[11] Patent Number: 6,014,663
[45] Date of Patent: Jan. 11, 2000

[54] SYSTEM, METHOD, AND COMPUTER PROGRAM PRODUCT FOR COMPARING TEXT PORTIONS BY REFERENCE TO INDEX INFORMATION

[75] Inventors: Kevin G. Rivette; Irving S. Rappaport, both of Palo Alto; Patrick O'Brien, Half Moon Bay, all of Calif.

[73] Assignee: Aurigin Systems, Inc., Mountain View, Calif.

[21] Appl. No.: 09/058,347

[22] Filed: Apr. 10, 1998

Related U.S. Application Data

[63] Continuation of application No. 08/590,082, Jan. 23, 1996, Pat. No. 5,754,840.

[51] Int. Cl.$^7$ ................................................. G06F 17/30
[52] U.S. Cl. .................... 707/4; 707/5; 707/512; 707/517
[58] Field of Search .............................. 707/3, 513, 102, 707/514, 1, 2, 526, 522, 101, 517, 512, 500, 4, 5, 8; 705/2; 364/400

[56] References Cited

U.S. PATENT DOCUMENTS

| | | | |
|---|---|---|---|
| 4,580,218 | 4/1986 | Raye ............................................. | 707/1 |
| 4,742,467 | 5/1988 | Messerich et al. ...................... | 395/703 |
| 4,823,306 | 4/1989 | Barbic et al. ............................... | 707/5 |
| 4,965,763 | 10/1990 | Zamora ........................................ | 704/1 |
| 5,040,227 | 8/1991 | Lyke et al. ............................... | 382/138 |
| 5,175,681 | 12/1992 | Iwai et al. ................................ | 364/400 |
| 5,247,437 | 9/1993 | Vale et al. .................................... | 707/1 |
| 5,276,616 | 1/1994 | Kuga et al. ................................ | 704/10 |
| 5,319,745 | 6/1994 | Vinsonneau et al. .................. | 707/515 |
| 5,321,770 | 6/1994 | Huttenlocher et al. ................. | 382/174 |
| 5,321,833 | 6/1994 | Chang et al. ............................... | 707/5 |
| 5,341,469 | 8/1994 | Rossberg et al. ....................... | 707/514 |
| 5,392,428 | 2/1995 | Robins ......................................... | 707/3 |
| 5,408,599 | 4/1995 | Nomura et al. .......................... | 707/516 |
| 5,440,482 | 8/1995 | Davis .......................................... | 707/6 |

(List continued on next page.)

OTHER PUBLICATIONS

Muramatsu et al., "The Construction of the Paperless System in Japan Patent Office", Systems Integration, 1992 $2^{nd}$ International Conference, pp. 278–287, (1992).

Smith et al., "PTO Cancels GUI Procurement", Government Computer News, vol. 13, No. 21, p. 3(1), (Sep. 19, 1994).

Jordan et al., "Specification for Rapid Prototyping Capability for the Automated Patent System", Computer Software and Applications Conference 1990 Compsac, pp. 76–81, (1990).

Takahashi, Ken, "Electronic Patent Application Starts in Japan", Newsbytes, Dec. 1990.

"Protect Your Ideas with PatentPro", http://www.4patpro.com, Jul. 8, 1997.

"Patent It Yourself (The Software)", http://www.aspensite.com/ibc/patent–it–yourself–sw.html, Jul. 30, 1997.

(List continued on next page.)

*Primary Examiner*—Thomas G. Black
*Assistant Examiner*—Charles L. Rones
*Attorney, Agent, or Firm*—Sterne, Kessler, Goldstein & Fox P.L.L.C.

[57] ABSTRACT

A system and method for assisting in the preparation of a document, and for analyzing a document, such as a patent or patent application, are described herein. The system aids a user to verify that terms in a patent application are being used consistently. The system also facilitates editing of the patent application so as to achieve terminology consistency. The system operates by allowing a user to select a document containing a patent application. The user then selects the specification portion of the patent application, and also selects the claims portion of the patent application. The system indexes the specification portion and the claims portion to thereby generate a merged index table. The system analyzes the merged index table to identify terms in the claims portion that are not present in the specification portion, and then displays these terms (called claim terms). A user can then edit the patent application so as to properly describe these terms in the specification.

21 Claims, 17 Drawing Sheets

U.S. PATENT DOCUMENTS

| | | | |
|---|---|---|---|
| 5,485,373 | 1/1996 | Davis et al. | 707/536 |
| 5,488,725 | 1/1996 | Turtle et al. | 707/5 |
| 5,526,443 | 6/1996 | Nakayama | 382/229 |
| 5,535,382 | 7/1996 | Ogawa | 707/5 |
| 5,557,722 | 9/1996 | DeRose et al. | 707/513 |
| 5,623,679 | 4/1997 | Rivette et al. | 707/526 |
| 5,623,681 | 4/1997 | Rivette et al. | 707/522 |
| 5,664,109 | 9/1997 | Johnson et al. | 705/2 |
| 5,701,459 | 12/1997 | Millett et al. | 707/3 |
| 5,717,912 | 2/1998 | Millett et al. | 707/3 |
| 5,717,924 | 2/1998 | Kawai | 707/102 |
| 5,754,840 | 5/1998 | Rivette et al. | 707/2 |
| 5,758,339 | 5/1998 | Barton et al. | 707/8 |
| 5,765,158 | 6/1998 | Burrows | 707/101 |
| 5,778,400 | 7/1998 | Tateno | 707/513 |
| 5,812,999 | 9/1998 | Tateno | 707/3 |
| 5,903,902 | 5/1999 | Orr et al. | 707/517 |

OTHER PUBLICATIONS

Bryant, J.H., Automating the Patent Search System, 1995 Videodisc, Optical Disk, and CD–ROM Conf. And Expo. Proceedings, pp. 33–35, (Dec. 1985).

Delorme, J.m "The Changing Face of Patent Information Systems in Europe and Worldwide", Electronic Publishing: The New Way to Communicate, Proceedings of the Symposium (EUR–10978–EN), pp. 131–138, (Nov. 1986).

"The Examiner Software: Read Why Your Competitors Use The Examiner Software to Check Their Patent Applications", The Law Works, vol. 2, No. 6, (Jun. 1995).

"Are You Building Patents that are Going to Stand Up", The Law Works, vol. 2, No. 5, (May 1995).

"Mapit Advanced Analytical Tool", The Law Works, vol. 3, No. 11, (Nov. 1996).

Sheremetyeva et al., "Knowledge Elicitation for Authoring Patent Claims", Computer Magazine, vol. 29, No. 7, (Jun. 1996).

Taylor, Ray, "Patent Automation: The Canadian Approach", World Patent Information, vol. 12, No. 3, pp. 151–154, (1990).

Cailian, Yan, "Automation of the Patent of China (CPO)", World Patent Information, vol. 15, No. 1, pp. 12–15, (1993).

Bendzel, Miklos, "The Hungarian Patent Information Policy", World Patent Information, vol. 15, No. 2, (1993).

Nakamura, Akihiro, "Paperless plan of the Japanese Patent Office and its Dissemination Policy", World Patent Information, vol. 13, No. 3, pp. 125–138, (1991).

Takei, Hidehiko, "The Paperless Program in JPO", World Patent Information, vol. 11, No. 1, pp. 14–24, (1989).

Alexander, Boyd L., "The U.S. Patent and trademark Office's Electronic Application System", World Patent Information, vol. 15, No.2, pp. 63–71, (1993).

Jones, Jennifer, "PTO Cancels Interactive Patent Tracking System", Federal Computer Week, vol. 8, No. 27, pp. 1–2, (1994).

Kawagoe, et al., "Topica Project: Towards the Total System for Presentation and Invention by Creativity–Acceleration", Systems Sciences, 1990 Annual Hawaii International Conference, Vo. 4, pp. 389–397.

"Who is SmartPatents, Inc.", http://www.smartpatents.com/whoi.html, (1997).

Aharonian, Gregory, "Patnews: Gerald Mossinghoff Appointed to Board of SmartPatents", 1997.

Dyson, Esther, "First Lets Hire All the Lawyers", Viewpoint, p. 41, (Jun. 13, 1994).

Temin, Thomas R., "Feds, Vendors Agree: Simplicity is the Key to making Imaging Work", Government Computer News, vol. 13, No. 21, pp. S4(9), (Oct. 1994).

East, T.W.R., "Patent Claims—How to Keep Track of Them", IEEE Aerospace and Electronic Systems Magazine, vol. 10, No. 8, p. 32, (Aug. 1995).

Borkin et al., "Some Issues in the Design of an Editor–Formatter for Structure Documents", IBM Cambridge Scientific Center Technical Report No. G320–2136, pp. 1–17, (Sep. 1981).

Arndt, Timothy, "Retrieval and Layout of Multimedia Documents using Iconic Indexing", American Society of Mechanical Engineers, Petroleum Div., vol. 59, pp. 339–346, (1994).

Printout of "Automatic Method and Apparatus for Keeping Glasses Clean From rain and Snow", The Examiner Report, printout dated May 23, 1995.

"Read Why Your Competitors use the Examiner Software to Check Their Patent Applications", The Examiner Software, Minneapolis, Minnesota, appears to b before Jun. 30, 1995.

"Scenes From Patent Law Practices featuring The Examiner Software", The Examiner, Minneapolis, MN, Date Unknown.

"10 reasons Why Your Office Should Have The Examiner", The Examiner, Copyright 1993.

Letter to "Patent Professional", The Examiner: Intelligent Tools for the Intellectual Property Industry, Date Unknown–Appears to be unknown before Jun. 30, 1995.

Aharonian, Gregory, "Patnews: Version 0 of My Patent Claims Analysis Program", p. 1–2, (Sep. 1996).

FIG. 8

SPECIFICATION INDEX TABLE ─802

| ⋮ | |
|---|---|
| RESIDES | 2 |
| SYSTEM | 3 |
| ⋮ | |

FIG. 9

CLAIMS INDEX TABLE ─902

| ⋮ | |
|---|---|
| REISSUE | 3 |
| REUSE | 2 |
| SYSTEM | 5 |
| ⋮ | |

FIG. 10

MERGED INDEX TABLE ─1002

| TERM | HITS IN SPEC | HITS IN CLAIMS | RECONCILED |
|---|---|---|---|
| ⋮ | | | |
| REISSUE | 0 | 3 | |
| RESIDES | 2 | 0 | |
| REUSE | 0 | 2 | |
| SYSTEM | 3 | 5 | |
| ⋮ | | | |

1004 → REISSUE
1006 → RESIDES
1008 → REUSE
1010 → SYSTEM

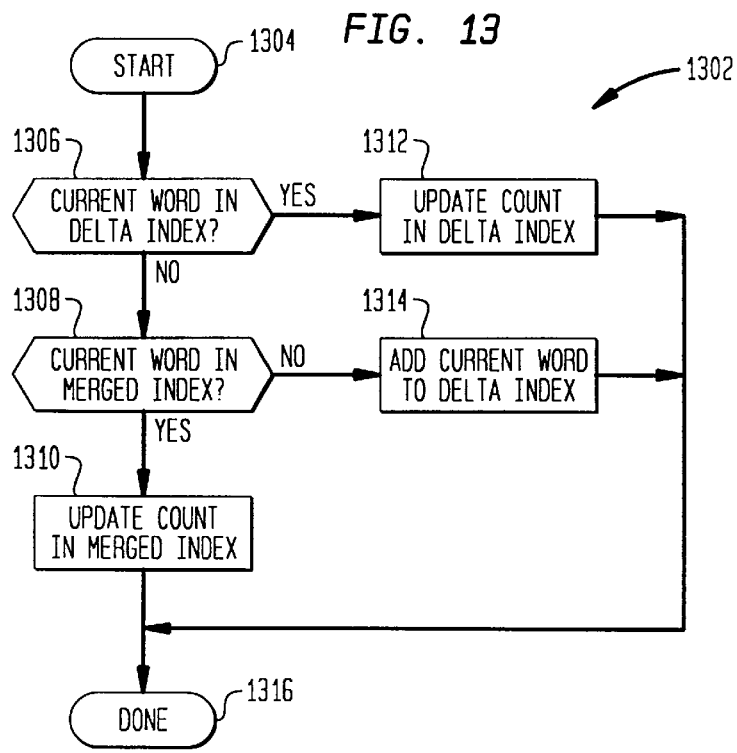
FIG. 13
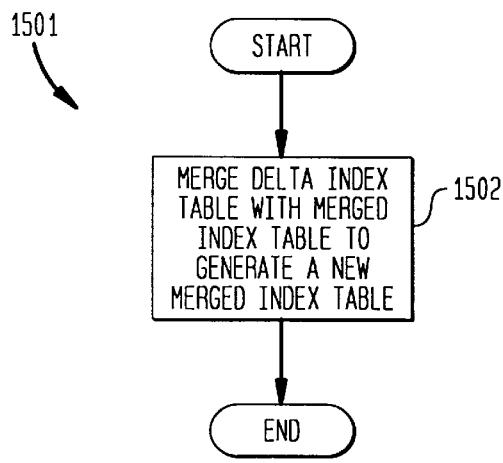
FIG. 14
| TERM | HITS IN SPEC | HITS IN CLAIMS |
|---|---|---|
| ⋮ | | |
| RIDGE | 3 | 2 |
| ⋮ | | |
DELTA INDEX TABLE — 1402
FIG. 15

6,014,663

SYSTEM, METHOD, AND COMPUTER PROGRAM PRODUCT FOR COMPARING TEXT PORTIONS BY REFERENCE TO INDEX INFORMATION

This application is a continuation of Ser. No. 08/590,082 filed Jan. 23, 1996 now U.S. Pat. No. 5,754,840.

BACKGROUND OF THE INVENTION

1. Field of the Invention

This present invention relates generally to developing, maintaining, and analyzing documents.

2. Related Art

When drafting certain types of documents, the choice of terminology can have significant ramifications. For example, in the patent field, the use of consistent terminology between the patent specification and the claims is extremely important. Inconsistent terminology could result in ambiguity, vagueness, and indefiniteness as to the subject matter being described and claimed. Such ambiguity, vagueness, and indefiniteness could negatively impact the prosecution of the patent application, and the validity and enforcement of any patent that may issue from the patent application.

The need for consistent terminology is not limited to patent documents. Other types of documents having stringent requirements of consistent terminology include legal documents (such as contracts and wills), business documents, technical/scientific manuscripts, medical documents, computer documents, etc.

Accordingly, a need exists for a system and method for enabling a user to easily determine whether consistent terminology exists in a document, and for enabling the user to easily modify the document so as to achieve consistent terminology.

SUMMARY OF THE INVENTION

The present invention is directed to a system and method for assisting in the preparation of a document, such as a patent application. The present invention aids a user to verify that terms in a patent application are being used consistently. The present invention also facilitates editing of the patent application so as to achieve terminology consistency. It can also be used to verify terminology consistency in an already existing document such as an issued patent.

The present invention operates by allowing a user to select a document containing a patent application or an issued patent. The user then selects the specification portion of the patent application, and also selects the claims portion of the patent application. The invention indexes the specification portion and the claims portion to thereby generate a merged index table. The invention analyzes the merged index table to identify terms in the claims portion that are not present in the specification portion, and then displays these terms (called claim terms).

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 7, 12, 13, 15, 17, 18, 19, 20, 21, 22, 23, 25, 26, 27, and 28 are flowcharts depicting the preferred operation of the present invention;

FIGS. 8, 9, 10, 14, and 24 are preferred index tables according to the present invention.

DETAILED DESCRIPTION OF THE PREFERRED EMBODIMENTS

Overview of the Invention

Figure 1:
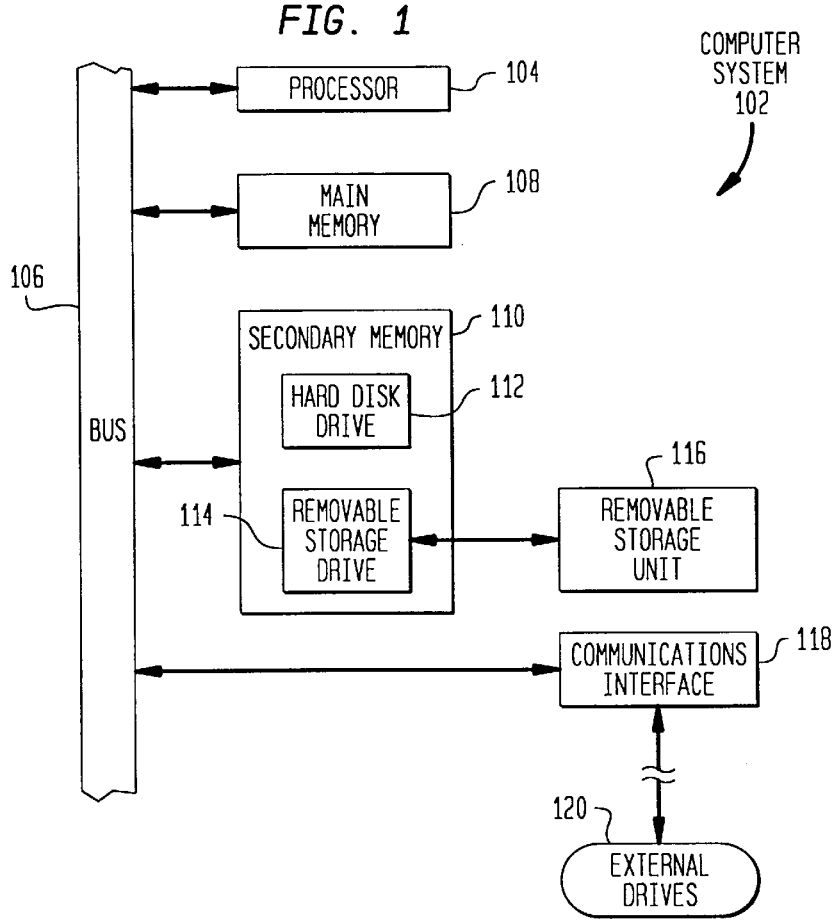
FIG. 1 is a block diagram of a preferred computer system of the present invention.

The present invention is directed to a system and method for enabling users to develop and maintain documents. The invention is particularly well suited and useful for developing and maintaining documents having stringent requirements of term consistency such as patent applications and patents and other patent-related documents, other legal documents (such as contracts and wills), business documents, technical/scientific manuscripts, medical documents, computer documents, educational documents, training manuals, reference documents such as encyclopedias, etc. Other types of documents requiring term consistency will be apparent to persons skilled in the relevant art(s).

The invention is also very useful for analyzing completed documents. For example, in the patent context, the invention is useful for analyzing an issued patent for the purpose of determining whether the preparation and filing of a Certificate of Correction, Reissue application, or Reexam application is necessary. Also, the invention is useful for analyzing a patent being litigated for potential indefiniteness issues.

The present invention operates to determine whether terms are used consistently throughout a document. Preferably, the present invention achieves this functionality by generating a first index of terms in a first portion of the document, and by generating a second index of terms in a second portion of the document. The invention processes the first index and the second index to enable users to easily determine whether terms are consistently used throughout the document. More particularly, the invention processes the first index and the second index to enable users to easily determine whether the use of terms in the first portion of the document is consistent with the use of terms in the second portion of the document.

The invention also enables users to easily edit and update the document so as to achieve term consistency. The invention enables users to re-index the document as they perform their edits and updates. In this manner, users can monitor their progress toward term consistency. In response to such a user command, in one embodiment the invention incrementally indexes the document. That is, the invention re-indexes only those portions of the document that have been modified by the users. This incremental indexing approach is advantageous since it requires less resources and is faster than full document indexing.

For illustrative purposes, the invention is described herein in the context of developing and maintaining patent applications, and in analyzing issued patents. For example, the invention was utilized during the preparation of this patent application. As indicated above, however, the invention is not limited to this embodiment. The invention is adapted and intended to operate with any document type having stringent requirements of term consistency. Such documents include, but are not limited to, patent applications and other patent-related documents, other legal documents (such as contracts and wills), business documents, technical/scientific manuscripts, medical documents, computer documents, etc.

Figure 16:
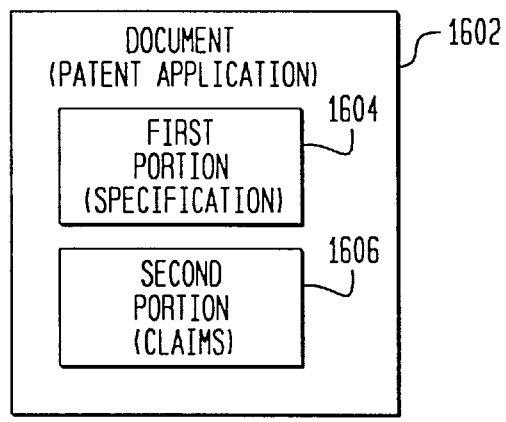
FIG. 16 depicts a document used by the present invention.

More particularly, the invention is adapted and intended to operate with any document 1602 having a first portion 1604 and a second portion 1606, where it is important that the terminology used in the first portion 1604 is consistent with the terminology used in the second portion 1606 (FIG. 16). In the patent context, the first portion 1604 is typically the specification of a patent application, and the second portion 1606 is typically the claims of the patent application. The invention is not limited to documents having two portions, as shown in FIG. 16. As will be apparent to persons skilled in the relevant art(s), the invention is easily adapted to documents having more than two portions.

Structure of the Invention

Figure 2:
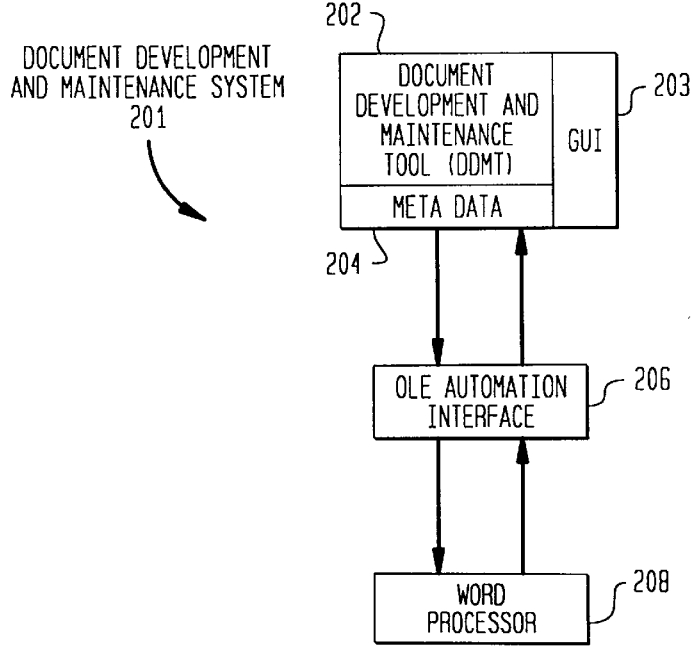
FIG. 2 is a block diagram of a document development and maintenance system according to a preferred embodiment of the present invention.

FIG. 2 is a block diagram of a document development and maintenance system 201 according to a preferred embodiment of the present invention. The system 201 includes a document development and maintenance tool (DDMT) 202 and a word processor 208. The DDMT 202 assists users in verifying the consistency of terms used in a document. The document is displayed in the word processor 208.

In performing its function, the DDMT 202 drives, controls, manipulates, and otherwise interacts with the word processor 208. For example, the DDMT 202 controls the word processor 208 so as to display particular portions of the document. Also, the DDMT 202 controls the word processor 208 so as to search for specific words. Further, the DDMT 202 controls the word processor 208 so as to display selected portions of the document simultaneously in a split screen.

Preferably, the present invention achieves this functionality by utilizing a word processor that supports the Object Linking Embedded (OLE) standard. The OLE standard is well known and defines the manner in which one software application may drive, control, manipulate, and otherwise interact with another software application. The OLE standard is described in many publicly available documents, such as *Microsoft OLE Programmers Reference*, Volumes I and II, 1993, which are herein incorporated by reference in their entirety.

Accordingly, the word processor 208 is one that supports the OLE standard. The DDMT 202 preferably controls and manipulates the word processor 208 via an OLE automation interface 206. The manner in which the DDMT 202 controls and manipulates the word processor 208 via the OLE automation interface 206 will be apparent to persons skilled in the relevant art(s).

Preferably, the word processor 208 is Microsoft Word for Windows version 6.0, but any word processor supporting OLE could alternatively be used, such as WordPerfect for Windows. The OLE automation interface 206 is preferably the Microsoft OLE Automation Interface. Use of Microsoft Word for Windows version 6.0 and Microsoft OLE Automation Interface are described in many publicly available documents, such as *Microsoft Word Developers Kit* (for version 6.0), 1995, which is herein incorporated by reference in its entirety.

It should be understood that the invention is not limited to use with OLE components. The word processor 208 can be any conventional or implementation specific word processor, as long as it has the capability of being externally controlled (in this case, as long as it has the capability of being controlled by the DDMT 202).

Standard word processing operations are mentioned in this patent application. Such operations include selecting text, opening files, moving between windows, resizing windows, editing documents, etc. Such word processing operations are well known and are described in many publicly available documents, such as *Microsoft Word for Windows Users Guide,* 1994, incorporated herein by reference in its entirety.

In an embodiment of the present invention, the document development and maintenance system 201 is implemented using a computer system 102 such as that shown in FIG. 1. The computer system 102 includes one or more processors, such as a processor 104. The processor 104 is connected to a communication bus 106. The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM or PROM), etc., which is read by and written to by removable storage unit 116. As will be appreciated, the removable storage unit 116 includes a computer usable storage medium having stored therein computer software and/or data. The removable storage drive 114 reads from and/or writes to a removable storage unit 116 in a well known manner. Removable storage unit 116, also called a program storage device or a computer program product, represents a floppy disk, magnetic tape, compact disk, etc.

Computer programs (also called computer control logic) are stored in main memory 108 and/or the secondary memory 110. Such computer programs, when executed, enable the computer system 102 to perform the functions of the present invention as discussed herein. In particular, the computer programs, when executed, enable the processor 104 to perform the functions of the present invention. Accordingly, such computer programs represent controllers of the computer system 102. The DDMT 202, word processor 208, and OLE automation interface 206 each preferably represents a computer program executing in the computer system 102.

The computer system 102 also includes a communications interface 118. The communications interface 118 enables the computer system 102 to communicate and interact with locally or remotely located external devices 120. In particular, communications interface 118 enables the computer system 102 to send and receive software and data to/from the external devices 120. Examples of the communications interface 118 include a modem, a network interface (such as an Ethernet card), a communications port, etc.

In one embodiment, the invention is directed to a system 102 as shown in FIG. 1, and having the functionality described herein. In another embodiment, the invention is directed to a computer program product having stored therein computer software (having the functionality described herein) for controlling computer systems, such as computer system 102. In another embodiment, the invention is directed to a system and method for transmitting and/or receiving computer software (having the functionality described herein) to/from external devices 120.

Operation of the Invention

Figure 17:
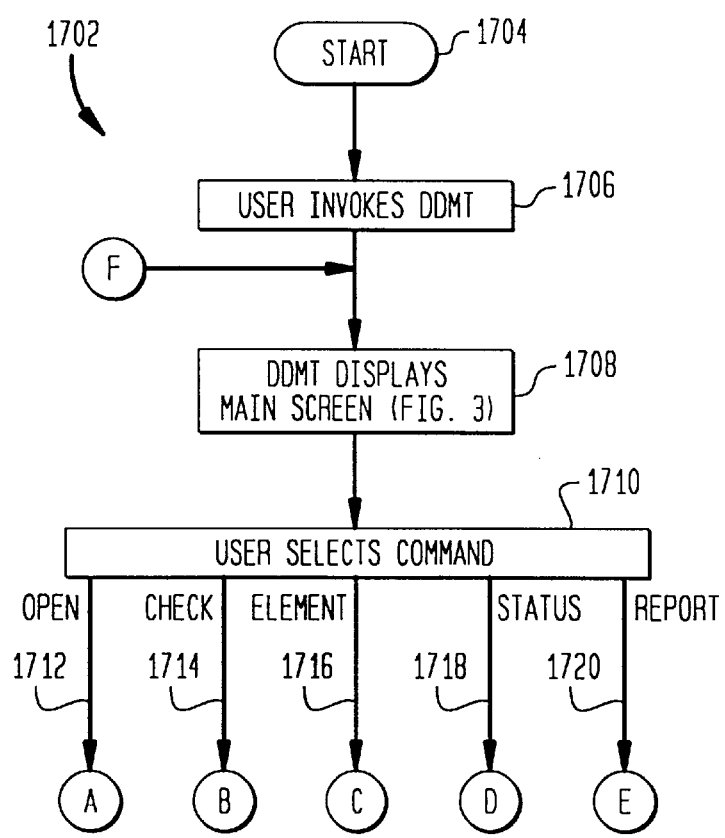

The operation of the present invention shall now be described with reference to a flowchart 1702 shown in FIG. 17. Flowchart 1702 illustrates the manner in which a user interacts with the document development and maintenance system 201 to develop, maintain, and/or analyze a document. More specifically, flowchart 1702 illustrates the manner in which a user interacts with the document development and maintenance system 201 to achieve consistent terminology (or analyze terminology) in a document being developed and/or maintained and/or analyzed.

Such interaction with the document development and maintenance system 201 is preferably achieved through interaction with a graphical user interface (GUI) 203 that forms part of the DDMT 202. As apparent from the discussion below, the GUI 203 of the present invention is very powerful and flexible. In particular, the GUI 203 allows users to access the functionality of the DDMT 202 in any number of ways. Accordingly, the operational steps shown in flowchart 1702 and in other flowcharts discussed below represent one way (i.e., one operational sequence) of accessing the functions provided by the DDMT 202. Users may access and traverse the functions provided by the DDMT 202 in any number of other ways via interaction with the menus provided by the GUI 203. Such other ways (i.e., such other operational sequences) will be apparent to persons skilled in the relevant art(s).

Flowchart 1702 begins with step 1704, where control passes immediately to step 1706.

In step 1706, the user invokes the DDMT 202 in any well known manner, such as selecting an icon associated with the DDMT 202.

Figure 3:
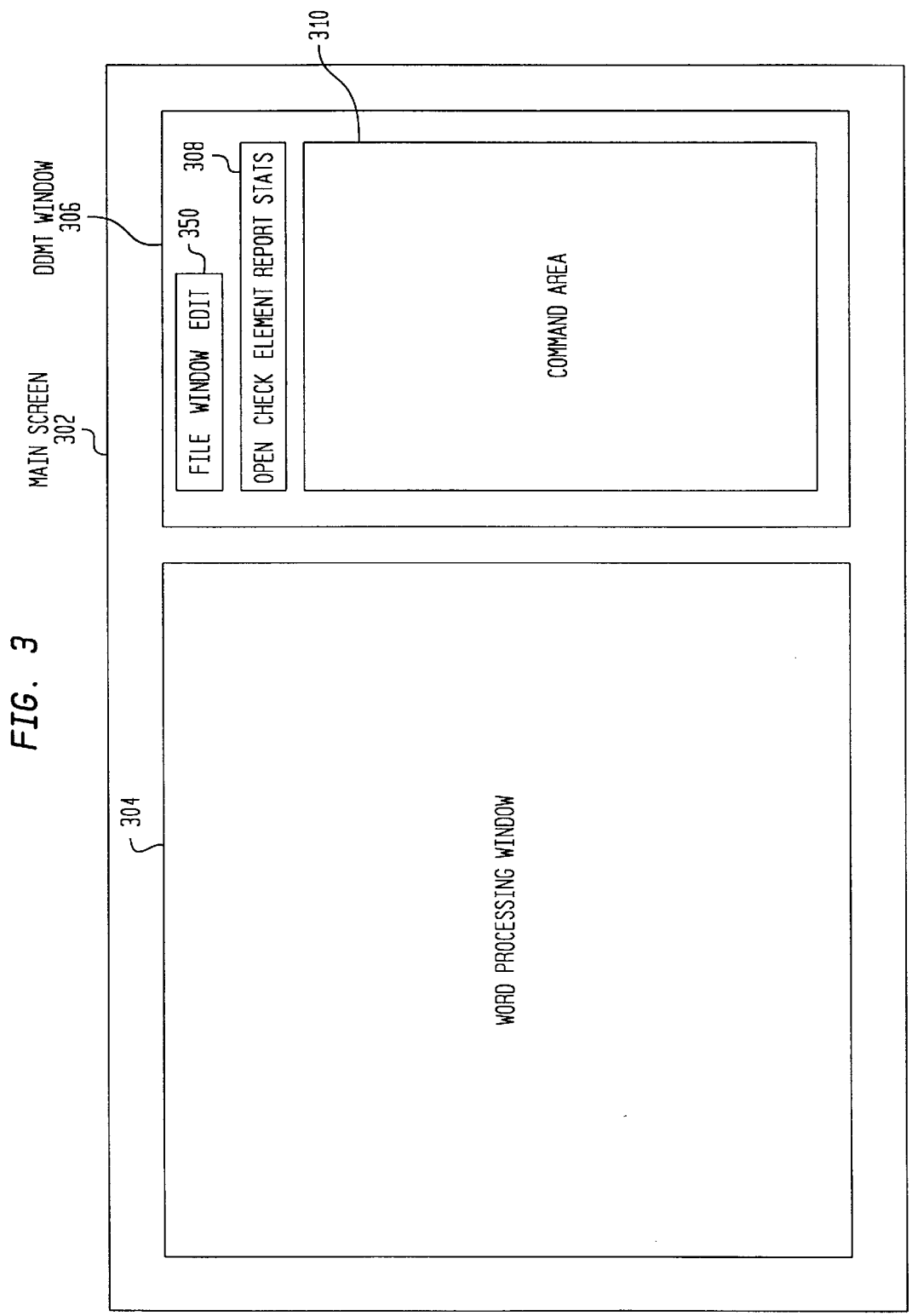
FIGS. 3, 4, 5, 6, 11, and 29 are screen shots generated by a graphical user interface of the present invention.

In step 1708, the DDMT 202 displays on a computer monitor a main screen 302 (FIG. 3). The main screen 302 includes a word processing window 304 and a DDMT window 306. The word processing window 304 is generated by the word processor 208 in accordance with commands from the DDMT 202. The DDMT window 306 is generated by the DDMT 202.

The DDMT window 306 includes a menu bar 350, a command list window 308 and a command area window 310. The following commands are available from the command list window 308: Open, Check, Element, Report, and Stats. The Open command is used to open and index a document. The Check command is used to view indexing results (so as to determine the extent to which terms are used consistently in the document), and to re-index the document. The Element command is used to element index the document (so as to determine the extent to which reference numbers are used consistently in the document). The Report command is used to generate reports pertaining to the index databases. The Stats command is used to view statistics pertaining to the use of the DDMT 202.

In step 1710, the user 1710 selects a command from the command list window 308. The user selects a command in any well known manner, such as through use of a pointing device (such as a mouse or trackball) or a keyboard. If the user selects the Open command, then control path 1712 is taken. If the user selects the Check command, then control path 1714 is taken. If the user selects the Element command, then control path 1716 is taken. If the user selects the Report command, then control path 1720 is taken. If the user selects the Stats (status or statistics) command, then control path 1718 is taken. Each of these commands and control paths are discussed below.

Open Command

Figure 18:
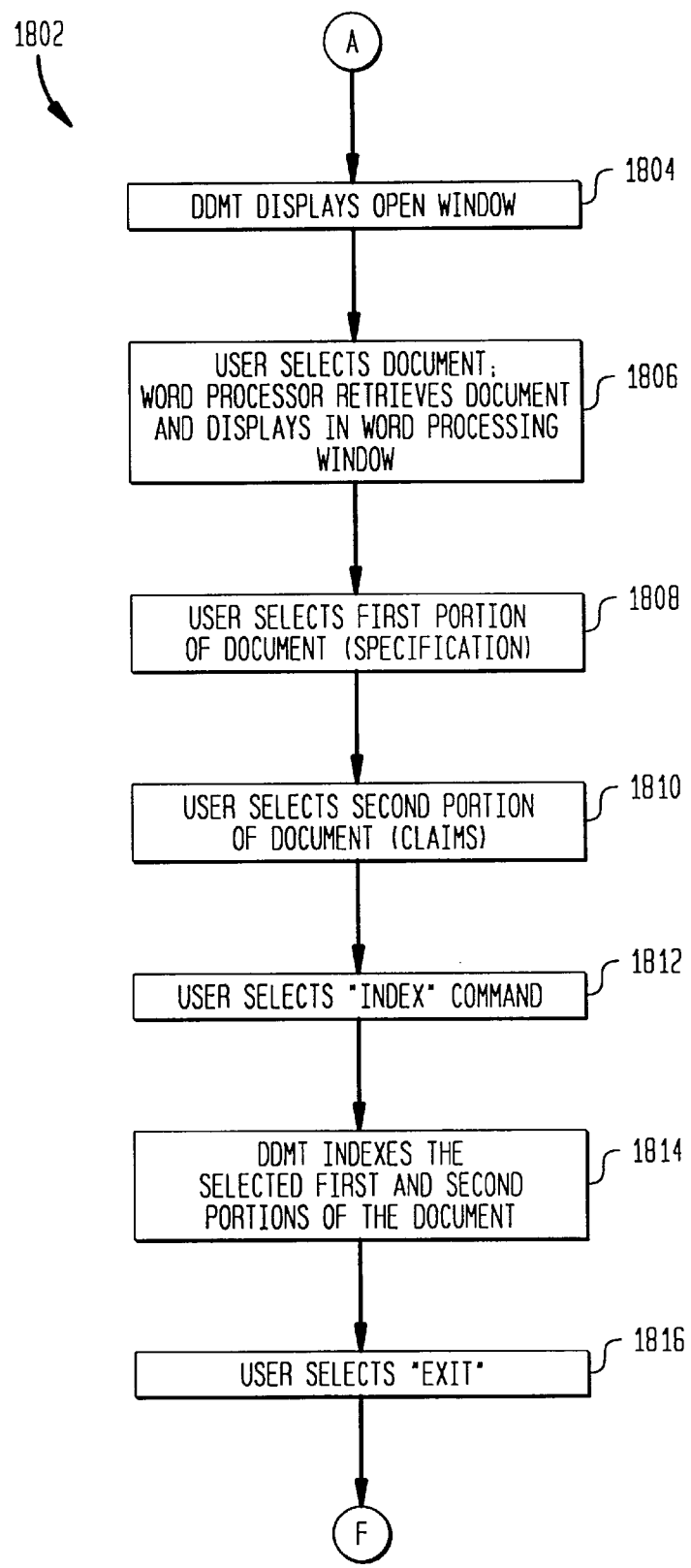

The operation of the DDMT 202 when processing the Open command shall now be described with reference to flowchart 1802 shown in FIG. 18.

Figure 4:
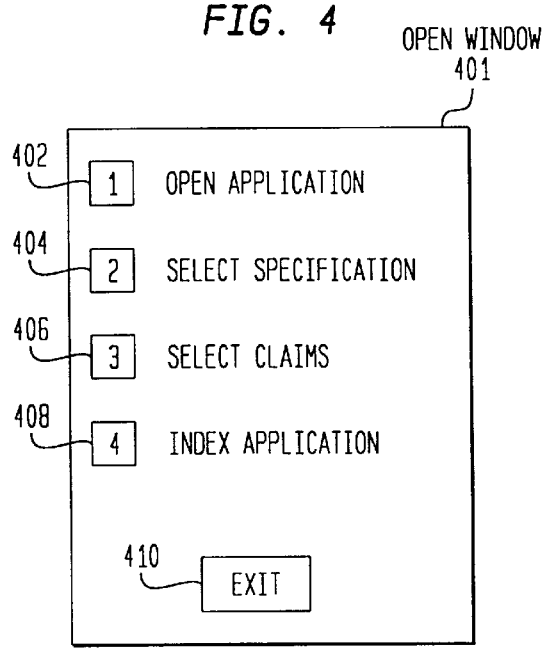

In step 1804, the GUI 203 displays an open window 401 (FIG. 4) in the command area window 310 (the command list window 308 and the menu bar 350 remain visible). The open window 401 includes an Open Application button 402, a Select Specification button 404, a Select Claims button 406, and an Index Application button 408. These buttons are labeled "1," "2," "3," and "4," indicating the sequence in which they should be pressed by the user so as to most effectively utilize the DDMT 202. Accordingly, the present invention is very user-friendly as it provides users with visual cues for interaction with the DDMT 202.

In step 1806, the user presses the Open Application button 402. The GUI 203 defaults to display the file name of the last document that the user worked with. The user can also command the GUI 203 to display the file names of documents having indexing information (that is, documents that the DDMT 202 has previously indexed), or a list of all documents whether indexed or not. From any one of these starting points, the GUI 203 allows the user to navigate in a well known manner through the current file directory or other directories until the desired document is located. The GUI 203 then allows the user to select the desired document in a well known manner. The selected document is called the current document for reference purposes. (In the following discussion, it is assumed that the user selects a patent application to work with. However, as discussed above, the invention is not limited to use with patent applications.) The DDMT 202 then commands the word processor 208 to retrieve the selected document and display the selected document in the word processing window 304.

In step 1808, the user presses the Select Specification button 404. In response to this user action, the DDMT 202 commands the word processor 208 to select a first portion of the current document. In the current example, the DDMT 202 commands the word processor 208 to select the specification of the patent application. Preferably, the DDMT 202 considers the specification (i.e., the first portion of the current document) to include all text from the beginning of the patent application to a boundary text phrase that marks the boundary between the specification and the claims. This boundary text phrase is a text phrase such as "What is claimed is," "What the inventors claim as their invention is," or some similar phrase. The DDMT 202 stores a list of boundary text phrases. During step 1808, the DDMT 202 compares the text in the patent application to the list of boundary text phrases until there is a hit (the user may select one of the boundary text phrases to search for). Note that there may be many occurrences of any given boundary text phrase in the current document. Accordingly, the user can command the DDMT 202 to find the next occurrence of the boundary text phrases. Eventually, the user verifies that the end of the first portion of the document has been identified by pressing a Done button or similar button (not shown) in the Open Window 401.

The GUI 203 also allows the user to enter additional, customized boundary phrases, and to manually select the specification in the patent application (using any well known method for selecting text in a word processor).

In step 1810, the user presses the Select Claims button 406. In response to this user action, the DDMT 202 commands the word processor 208 to select a second portion of the current document. (The first and second portions selected in steps 1808 and 1810 are those that are analyzed for term consistency.) In the current example, the DDMT 202 commands the word processor 208 to select the claims of the patent application. Preferably, the DDMT 202 considers the claims to include all text from the boundary phrase (described above) to the end of the patent application. Alternatively, the DDMT 202 considers the claims to include all text from the boundary phrase (described above) to the beginning of the Abstract (identified by a second boundary phrase).

Alternatively in step 1810, the user selects any subset of the claims. For example, the invention allows the user to select a single claim. In this case, the selected claims are indexed (indexing is discussed below).

In step 1812, the user presses the Index Application button 408.

In step 1814, the DDMT 202 in response to the user command in step 1812 indexes the first portion (for example, the specification) and the second portion (for example, the claims) of the current document (for example, the patent application). This indexing operation is discussed below.

In step 1816, the user presses an Exit button 410. Control then returns to step 1708 in FIG. 17. The user could alternatively navigate elsewhere by pressing the buttons in the command list window 308.

In an alternate embodiment, steps 1808, 1810, 1812, and 1814 are replaced by a single step. In this step, the user presses the Select Specification button as described above. The DDMT 202 locates the boundary between the first portion and the second portion (assuming that all text above the boundary is the first portion and all text below the boundary is the second portion), and then automatically indexes the document. The GUI 203 also allows the user to confirm that the boundary has been correctly identified, and allows the user to traverse through the current document so as to identify the boundary.

Complete Indexing

Figure 7:
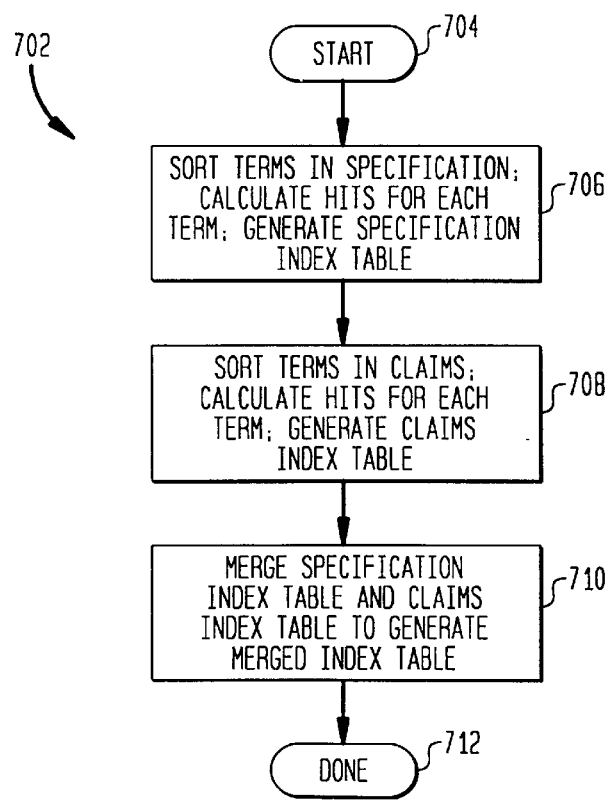

The manner in which the DDMT 202 indexes the first and second portions of the current document in step 1814 shall now be described with reference to a flowchart 702 in FIG. 7. Flowchart 702 represents a complete (or full) indexing of the first and second portions. A full indexing involves an indexing of each term in the first and second portions. (This is in contrast to an incremental indexing, which involves only portions of the current document that have been selected and modified by the user. Incremental indexing is discussed below.)

In step 706, the DDMT 202 creates a sorted list of the terms that appear in the first portion of the current document (for example, the specification). As used herein, a term is a sequence of alphabetic or numeric characters. Preferably, a term does not include spaces or punctuation characters. However, the definition of a term is adjustable (this is useful in many types of documents, such as patent applications dealing with chemical or biotechnology inventions).

The terms in the list generated in step 706 are sorted alphanumerically. The number of times that a given term appears in the sorted list is equal to the number of times that the term appears in the first portion.

For example, suppose that the specification is as follows: "Computer 206A resides in computer system 206B. This system 206B itself resides in computer system 206C."

In this example, the sorted list created in step 706 would be as follows:

206A
206B
206B
206C
computer
computer
computer
in
in
itself
resides
resides
system
system
system
this
Table 1

Also in step 706, the DDMT 202 calculates the number of hits for each term (by inspection of the sorted list), and generates a specification index table (also called the first index table). An example specification index table 802 is shown in FIG. 8. The specification index table 802 includes a row for each unique term from the sorted list, and stores the number of hits of that term in the first portion of the current document. The terms are ordered alphanumerically. Accordingly, with regard to the above example, the specification index table 802 includes a row for "resides" and a row for "system," and indicates that resides had two hits and system had three hits.

In step 708, the DDMT 202 creates a sorted list of the terms that appear in the second portion of the current document (for example, the claims). Also in step 708, the DDMT 202 calculates the number of hits for each term (by inspection of the sorted list), and generates a claims index table (also called a second index table). An example claims index table 902 is shown in FIG. 9. The operation of the DDMT 202 during step 708 is similar to that during step 706.

In step 710, the DDMT 202 merges the specification index table 802 with the claims index table 902 in a well known manner to thereby generate a merged index table. An example of a merged index table 1002 is shown in FIG. 10. The merged index table 1002 includes a row for each unique term from the specification index table 802 and the claims index table 902. Each row indicates the number of hits of the term in the specification, and the number of hits of the term in the claims. Each row also includes a reconciled field that takes a boolean value. The reconciled field is discussed in greater detail below.

Flowchart 702 is complete after step 710 has been performed, as indicated by step 712.

Check Command

The operation of the DDMT 202 when processing the Check command shall now be described with reference to flowchart 1902 shown in FIG. 19.

In step 1904, the DDMT 202 displays a check window 501 (FIG. 5) in the command area window 310 (FIG. 3).

In step 1906, the DDMT 202 determines whether the current document has been previously indexed. Preferably, the DDMT 202 maintains a master data file that stores information pertaining to every document processed by the DDMT 202. Specifically, the master data file indicates for each document whether the document has been indexed. In this embodiment, the DDMT 202 performs step 1906 by reference to the master data file. Alternatively, the DDMT 202 performs step 1906 by determining whether a merged index table 1002 exists for the current document. In particular, the DDMT 202 in step 1906 determines that the current has been previously indexed if a merged index table 1002 exists for the current document. If the current document has not been previously indexed, then step 1910 is performed (discussed below). Otherwise, step 1908 is performed.

Figure 20:
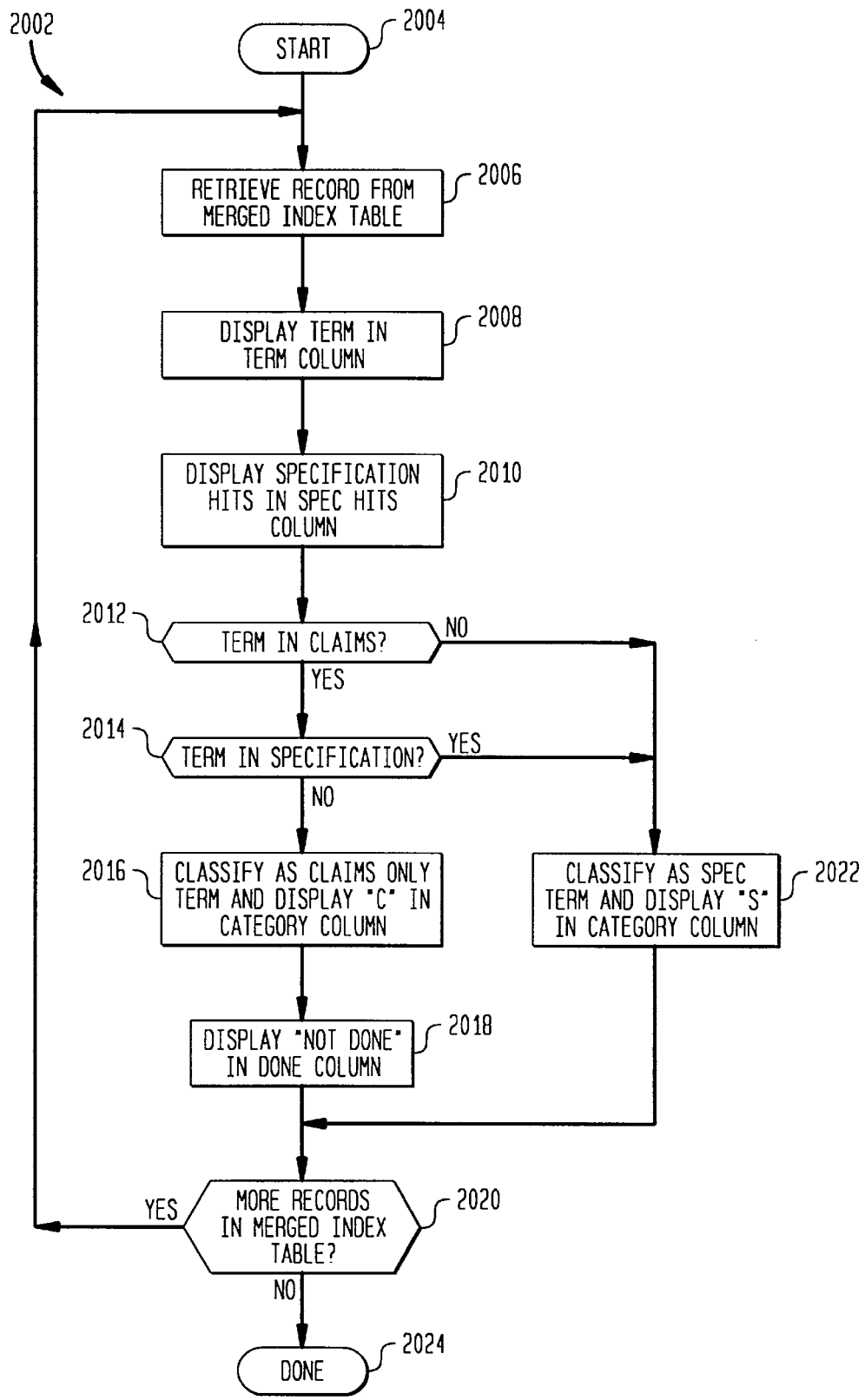

In step 1908, the DDMT 202 retrieves index information from the merged index table 1002 and displays such index information in a hit matrix 510 of the check window 501. A flowchart 2002 in FIG. 20 depicts the manner in which the DDMT 202 performs step 1908.

In step 2006, the DDMT 202 retrieves a record from the merged index table 1002. For illustrative purposes, assume that record 1004 in FIG. 10 is retrieved.

Figure 5:
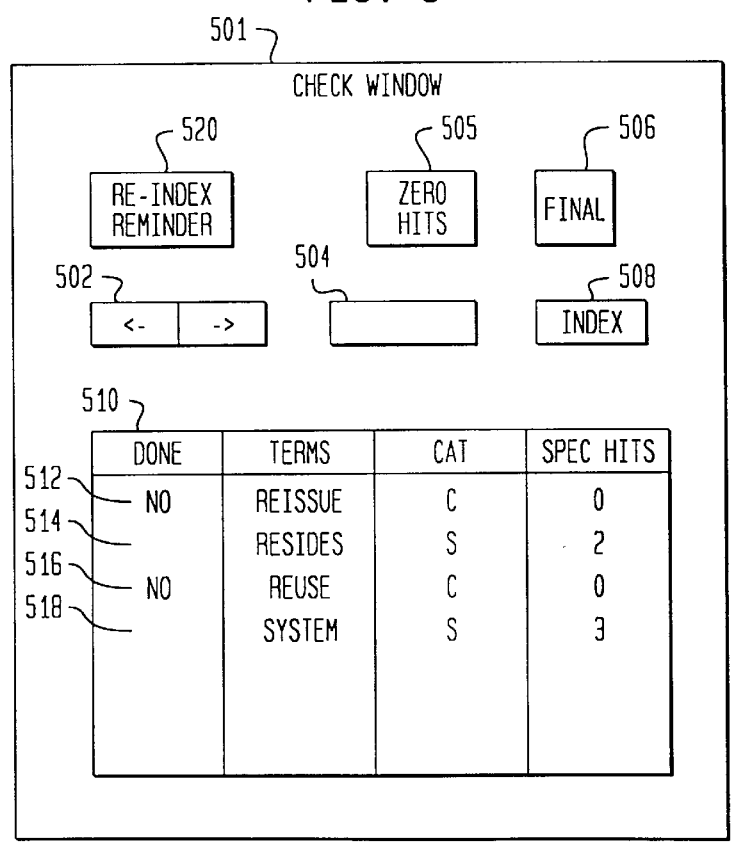

In step 2008, the DDMT 202 displays the term name (in this case, "reissue") in the Term column of a row of the hit matrix (see row 512 of FIG. 5).

In step 2010, the DDMT 202 displays the number of specification hits (in this case, 0) in the Spec Hits column of the row 512.

In step 2012, the DDMT 202 determines whether there were any hits of the term in the claims (by inspection of the record retrieved from the merged index table 1002). If there were no claim hits, then the DDMT 202 in step 2022 classifies the term as a specification term. A specification term is a term that appears in the specification. A specification term may or may not appear in the claims. Also in step 2022, the DDMT 202 displays a "S" (for specification term) in the Category (CAT) column of the row (see rows 514 and 518).

If, in step 2012, the DDMT 202 determined that the term had at least one hit in the claims, then step 2014 is performed. In step 2014, the DDMT 202 determines whether there were any hits of the term in the specification (by inspection of the record retrieved from the merged index table 1002). If there were hits in the specification, then step 2022 is performed (described above). Otherwise, step 2016 is performed.

In step 2016, the DDMT 202 classifies the term as a claims term. A claims term is one that appears in the claims, but does not appear in the specification. Also in step 2016, the DDMT 202 displays a "C" (for claims term) in the Category (CAT) column of the row (see rows 512 and 516).

A claims term is a term that may not be adequately described in the specification (since it does not appear in the specification). A claims term may also represent a term that is being called one thing in the claims, and another thing in the specification. Accordingly, claims containing claims terms may be vague, indefinite, and/or ambiguous. By automatically identifying claims terms, the invention aids users in eliminating vagueness, indefiniteness, ambiguity, and term inconsistency from their documents.

It is likely that a user will want to modify the current document in the word processor window 304 so as to eliminate claims terms (i.e., so as to convert claims terms to specification terms). The invention aids the user in this task by displaying "No" in the Done column of each row of the hit matrix 510 corresponding to a claims term (see rows 512 and 516). The DDMT 202 marks the Done column in this manner in step 2018. "No" means that the user has not yet modified the specification to reference and/or describe the claims term. Accordingly, the Done column represents a "to-do" list of terms that must be accounted for in the specification. (The Done column is also used to determine when re-indexing is necessary, as discussed below.)

As discussed below, the user preferably edits the specification with respect to each claims term (as indicated by the Done column and the CAT column) so as to achieve terminology consistency, and to provide sufficient description of the term in the specification. Once the user has edited the specification for a particular claims terms (i.e., to reference and/or describe the claims term in the specification), the user clicks on "No" in the Done column. The GUI 203 then changes the "No" to "Yes," thereby indicating that editing of the specification for the claims term has been performed.

The steps of flowchart 2002 are performed for each record in the merged index table 1002, as indicated by step 2020.

Referring again to FIG. 19, in step 1910 the GUI 203 receives a user command from the check window 501. Possible commands include edit, term navigation, index, and view. These commands are discussed below.

Check Window—Edit

Figure 22:
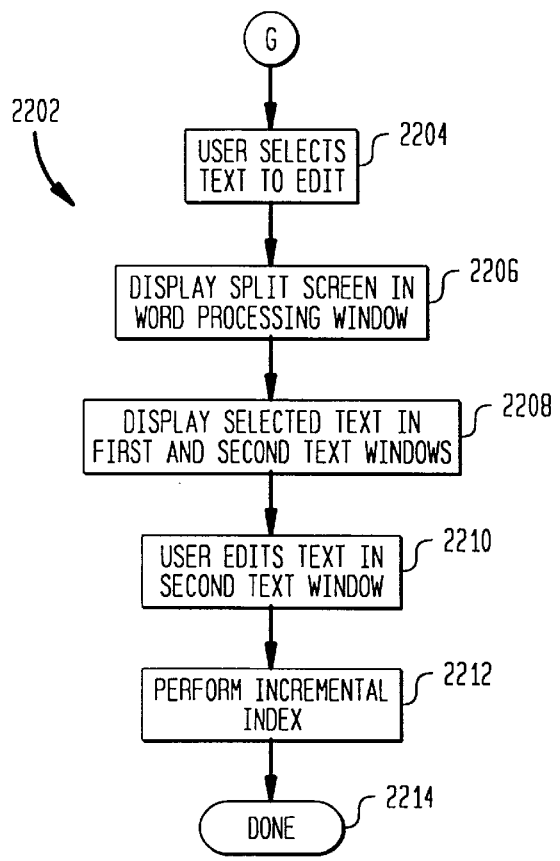

The user selects the edit command by selecting the edit command from the menu bar 350 in the DDMT window 306. Editing of the current document then proceeds as shown in a flowchart 2202 of FIG. 22.

In step 2204, the user in the word processing window 304 selects text to edit in any well known manner. Typically, the user will edit text involving a claims term that is tagged with a "No" or "Not Done" message in the row of the hit matrix 510 corresponding to the claims term (this tag indicates that the user has not yet attended to this claims term).

Figure 11:
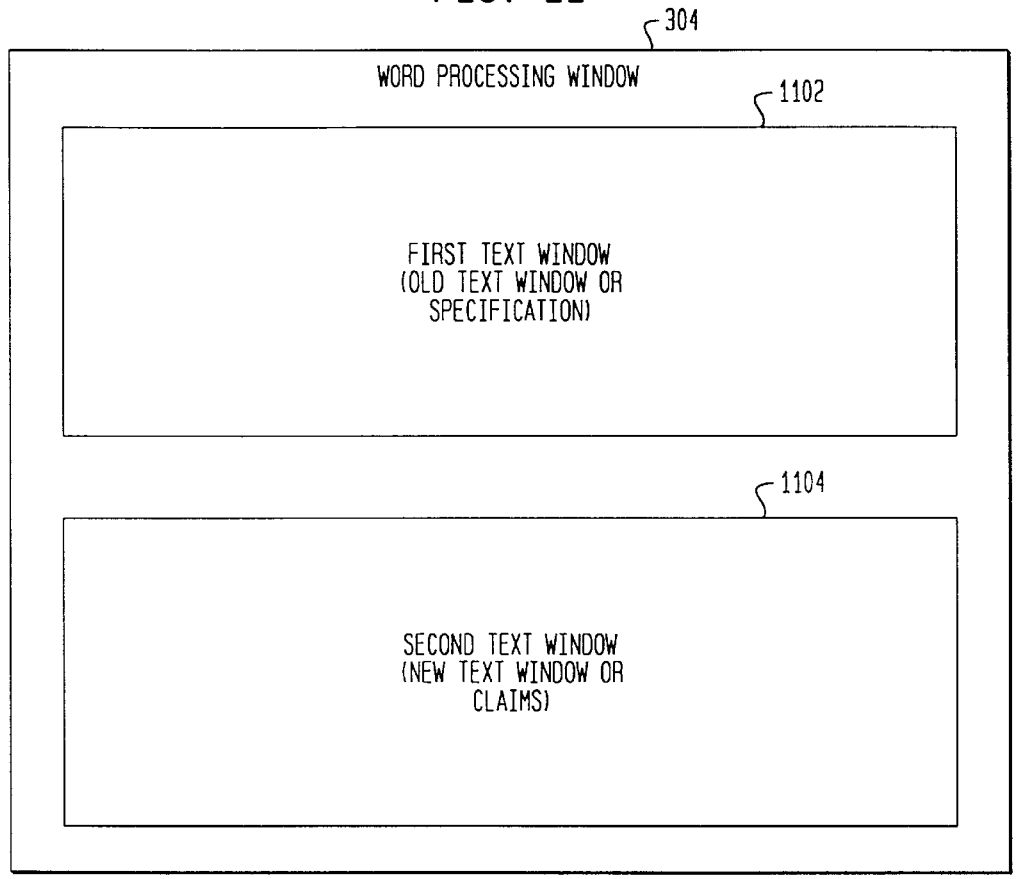

In step 2206, the DDMT 202 commands the word processor 208 to present a split screen in the word processing window 304. An example split screen is shown in FIG. 11, where the word processing window 304 includes a first text window 1102 and a second text window 1104.

In step 2208, the DDMT 202 commands the word processor 208 to display the selected text in both the first and second text windows 1102, 1104. Preferably, the DDMT 202 commands the word processor 208 to lock the first window 1102 so that no edits may be made in the first window 1102.

In step 2210, the user makes any edits that he/she wishes in the second text window 1104. Note that, at this point, the merged index table 1002 for the current document is out of date. Preferably, after completing the editing of the current document with respect to a claims term (such that the term is used consistently throughout the current document, and the term is sufficiently described in the specification), the user double clicks on (or otherwise selects) "No" or "Not Done" in the Done column of the row in the hit matrix 510 corresponding to the term. This toggles the Done column such that the Done column is modified to display "Done." Such action has three consequences. First, it provides a visual cue to the user that he/she has completed all edits pertaining to the claims term. Second, it causes the DDMT 202 to activate a re-index reminder 520. The re-index reminder 520 serves to remind the user that the merged index table 1002 is now out of date, and that re-indexing of the current document is necessary. The re-index reminder 520 is preferably an animated graphic of a revolving globe, but could be any other effective visual cue. Third, it causes the DDMT 202 to store True or Yes or Complete or some similar message in the Reconciled column of the record in the merged index table 1002 corresponding to the claims term. This message indicates that the user has edited the specification with respect to the claims term (so as to reference and or describe the claims term in the specification).

(The reconciled column in the merged index table 1002 is used during program startup. When the user selects a document for use with the DDMT 202, the DDMT 202 checks the reconciled column for the merged index table 1002 associated with the selected document (if a merged index table 1002 exists). If any term has a reconciled value of "Yes" or "True" or "Complete," the DDMT 202 activates the re-index reminder 520. All reconciled values are reset to "No" or cleared after indexing has taken place.)

After the user has completed editing the selected text, the user selects a "Done Editing" command from the Edit drop down menu on the menu bar 350 of the DDMT window 306. Other methods for signaling the editing of the selected text could also be used, such as adding a command button or menu command in the word processing window 304, or adding an OK button in the check window 501. Upon completion of the editing of the selected text, step 2212 is performed.

In step 2212, the DDMT 202 performs an incremental index 2212 involving only the text that has been selected for editing (by the user in step 2204). Flowchart 2202 is complete after step 2212 is performed, as indicated by step 2214.

Figure 12:
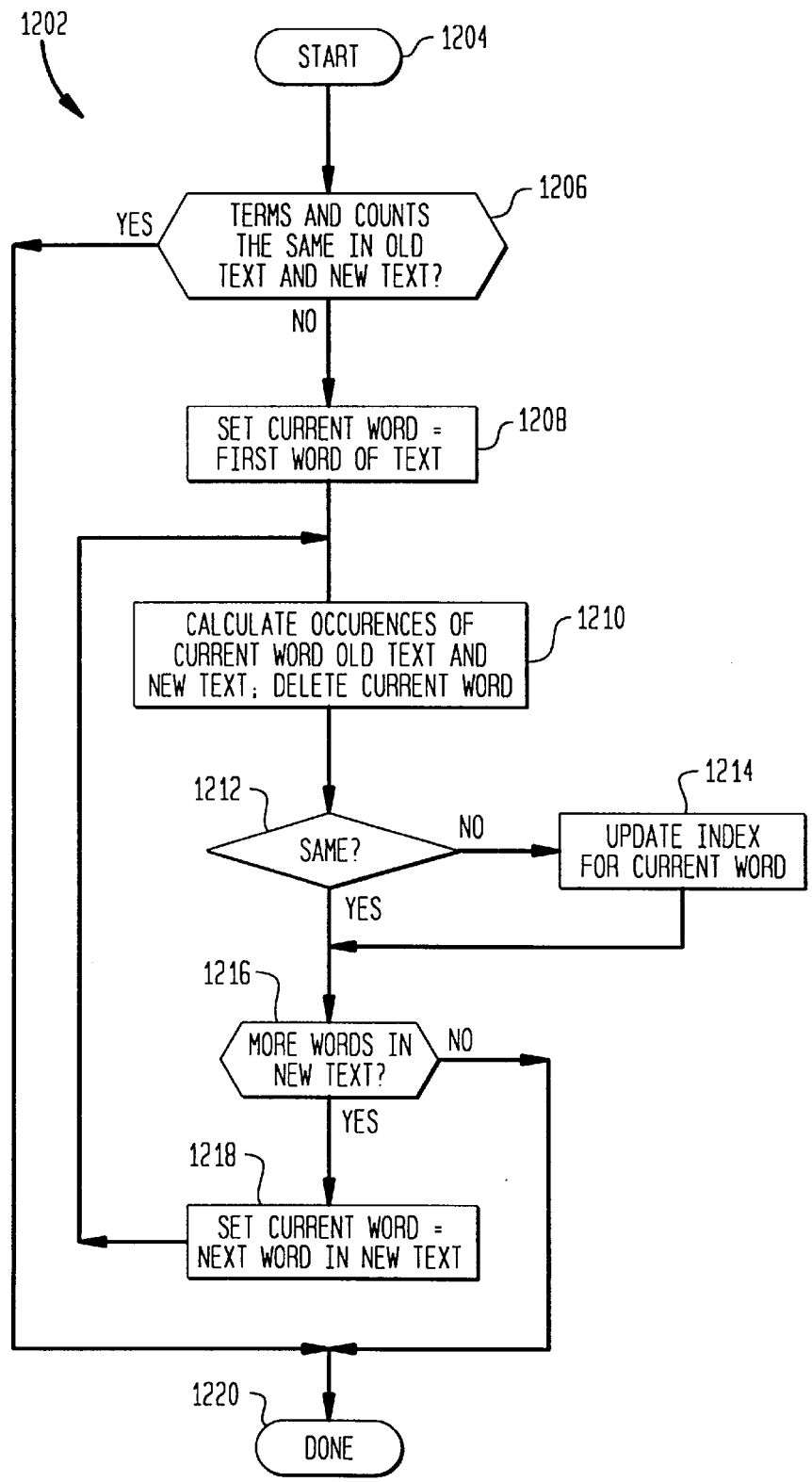

A flowchart 1202 in FIG. 12 depicts the manner in which the DDMT 202 performs incremental indexing.

In step 1206, the DDMT 202 determines whether the terms and the counts of the terms in the original or old text (displayed in the first text window 1102) is the same as that in the new or modified text (displayed in the second text window 1104). This is done by determining whether the old text is identical to the new text. If the old text is identical to the new text, then incremental indexing is not required. Flowchart 1202 is then complete, as indicated by step 1220.

If the old text is not identical to the new text, then step 1208 is performed. In step 1208, the DDMT 202 sets the current word (i.e., term) equal to the first word in the next text.

In step 1210, the DDMT 202 calculates the occurrences (i.e., the hits) of the current word in the new text, and the occurrences of the current word in the old text. The DDMT 202 also deletes the current word from both the new text and the old text (in the flowchart 1202 of FIG. 12, the DDMT 202 is not working with the saved copy of the new text; thus, the operation of the DDMT 202 in step 1210 does not affect the actual, current document).

In step 1212, the DDMT 202 determines whether the number of hits of the current word in the new text and the old text is the same. If they are not the same, then the DDMT 202 in step 1214 updates the index for the current word (such updating is described below).

If the number of hits is the same, or after performing step 1214, the DDMT 202 in step 1216 determines whether there are more words in the new text to process. If there are more words to process, then the DDMT 202 in step 1218 sets the current word equal to the next word in the new text. Control then returns to step 1210.

The manner in which the DDMT 202 updates the index for the current word shall now be described with reference to a flowchart 1302 in FIG. 13. Before doing so, however, it would be useful to describe the delta index table 1402 shown in FIG. 14.

The DDMT 202 maintains a delta index table 1402 for each session of the DDMT 202 while working with a given document (i.e., the current document). If the user begins work with another document, or begins a new session (i.e., exits and then returns to the DDMT 202), then a new delta index table 1402 is used. The delta index table 1402 includes rows for terms. The terms in the delta index table 1402 and the merged index table 1002 are mutually exclusive. That is, a term appears in either the merged index table 1002 or the delta index table 1402, but not both. For each term, the delta index table 1402 stores the number of hits in the specification, and the number of hits in the claims.

Referring now to FIG. 13, in step 1306 the DDMT 202 determines whether the current word is in the delta index table 1402. If the current word is in the delta index table 1402, then the DDMT 202 in step 1312 determines the delta count. The delta count is equal to: (hits in new text) minus (hits in old text). The DDMT 202 then adds the delta count to either the Spec hits count or the Claims hits count in the delta index table 1402, depending on whether the new text (and old text) that was edited by the user is located in the specification or claims, respectively.

If, in step 1306, it is determined that the current word is not in the delta index table 1402, then step 1308 is performed. In step 1308, the DDMT 202 determines whether the current word is in the merged index table 1002. If the current word is not in the merged index table 1002, then the DDMT 202 adds the current word to the delta index table 1402. The DDMT 202 does this by adding a new row (sorted alphanumerically with existing rows) in the delta index table 1402. Then, the DDMT 202 adds the name of the current word in the Term column, and stores the count of the current word in either the Spec Hits column or the Claim Hits column, depending on whether the new text (and old text) is located in the specification or claims, respectively.

If it is determined in step 1308 that the current word is in the merged index table 1002, then the DDMT 202 in step 1310 determines the delta count (as discussed above). The DDMT 202 then adds the delta count to either the Spec hits count or the Claims hits count in the merged index table 1002, depending on whether the new text (and old text) is located in the specification or claims, respectively.

Check Window—Alternative Editing

The invention supports another mode for editing the current document while the check window 501 is being displayed (actually, the user can use this mode for editing in the word processing window 304 no matter what is in the DDMT window 306). According to this mode, the user can simply edit the current document that is displayed in the word processing window 304 in a well known manner. Note, however, as soon as the document is edited, the merged index table 1002 is out of date with respect to the current document. Accordingly, re-indexing is necessary.

Most word processors set a dirty flag when the document being displayed has been edited. The DDMT 202 periodically interacts with the word processor 304 to determine the value of the dirty flag. If the dirty flag indicates that the current document has been edited, then the DDMT 202 activates the re-index reminder 520, to remind the user to re-index the document.

This alternate mode of editing does not support incremental indexing. Accordingly, the user must re-index the entire document when editing according to this alternate mode.

Check Window—Term Navigation

Referring again to FIGS. 5 and 19, the user selects the term navigation command by selecting a term in hit matrix

510, and then clicking on (or otherwise selecting) the arrow buttons 502. If the user clicks on the back arrow, then the DDMT 202 commands the word processor 208 to locate and display text surrounding the nearest previous occurrence of the selected term. If the user clicks on the forward arrow, then the DDMT 202 commands the word processor 208 to locate and display text surrounding the next occurrence of the selected term. A navigation field 504 indicates which hit is being displayed, such as "5 of 32." (This indicates that hit 5 of 32 hits is currently being displayed in the word processing window 304.) This functionality is represented by step 1920 in FIG. 19.

The invention also facilitates navigation through the claims terms (i.e., the zero specification hits terms). The user navigates in this manner by pressing a zero hits button 505. Upon receipt of such a command, the DDMT 202 jumps to the next claims term in the hit matrix 510 (the hit matrix 510 is typically a scroll window). Also, the DDMT 202 commands the word processor 208 to locate and display text surrounding the first occurrence of the claims term in the word processing window 304 (in either single screen or multiscreen mode).

This aspect of the invention can employ either a single screen or a split screen in the word processing window 304. This functionality is described below.

Check Window—Index (Re-Index)

Figure 19:
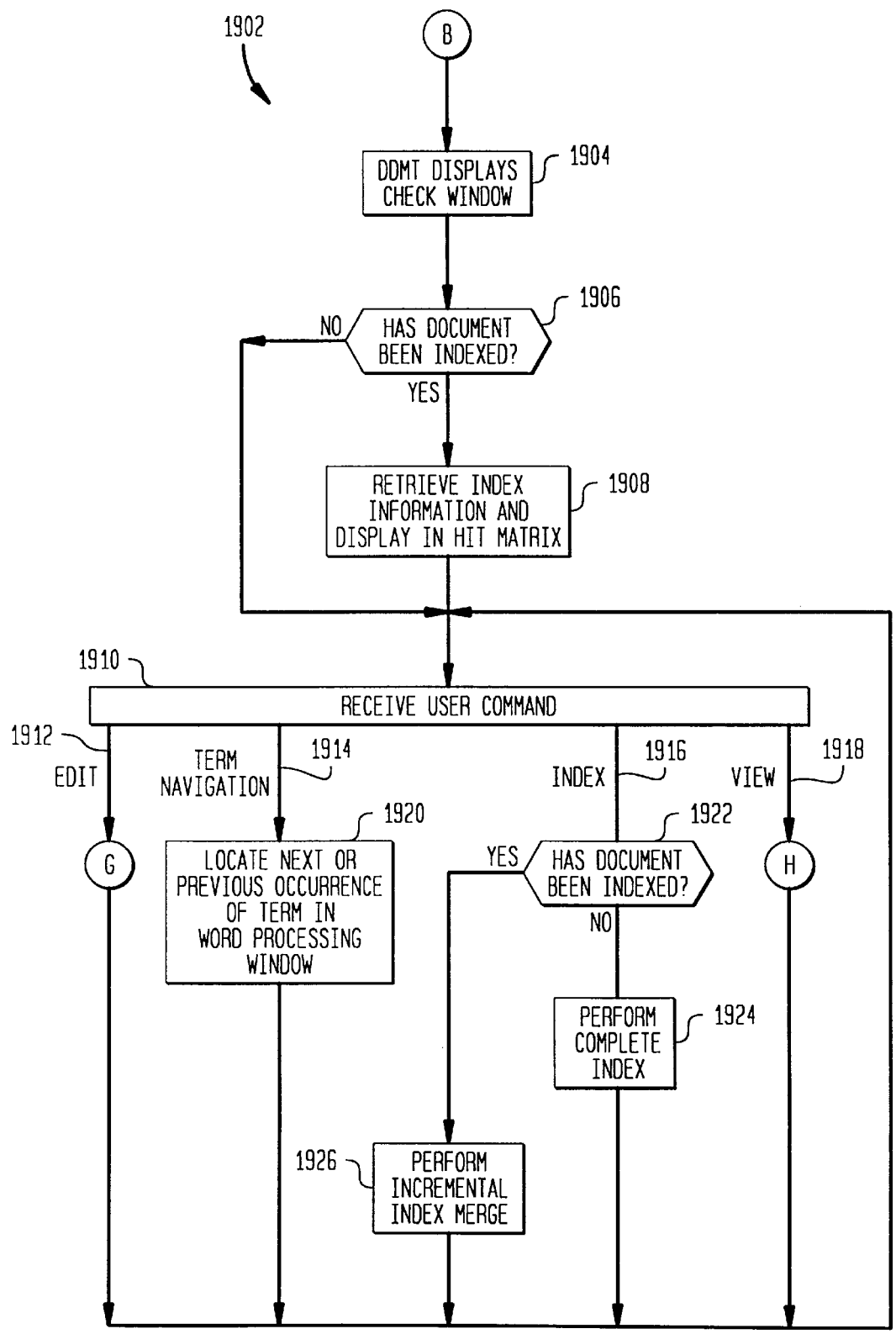

Referring to FIG. 19, the user selects the index (or re-index) command by clicking on the index button 508. Control then flows to step 1922. In step 1922, the DDMT 202 determines whether the current document has already been indexed (by looking for the existence of a merged index table 1002, or by looking in the master data file, as discussed above), and whether an delta index table 1402 exists. If the current document has not already been indexed, or if a delta index table 1402 does not exist, then the DDMT 202 in step 1924 performs a complete index function, as described above. Otherwise, the DDMT 202 in step 1926 performs an incremental index merge. The DDMT 202 performs an incremental index merge by merging, in a well know manner and as described above, the merged index table 1002 with the delta index table 1402. This is represented by step 1502 in flowchart 1501 (FIG. 15).

Check Window—View

Figure 21:
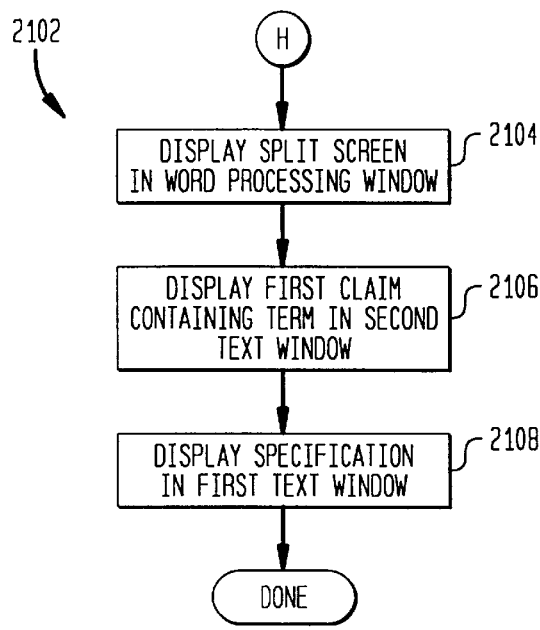

The user elects to view specific terms in the document by selecting a term from the hit matrix 510 in the check window 501, and then selecting a split screen option in the Window pull down menu in the menu bar 350 of the DDMT window 306. Control then flows to step 2104 in FIG. 21. In step 2104, the DDMT 202 commands the word processor 208 to display a split screen in the word processing window 304, as shown in FIG. 11.

In step 2106, the DDMT 202 commands the word processor 208 to search for the first occurrence of the selected term in the claims section, and to display text surrounding this occurrence in the second text window 1104.

In step 2108, the DDMT 202 commands the word processor 208 to search for the first occurrence of the selected term in the specification, and to display text surrounding this occurrence in the first text window 1102.

In this manner, the user can easily view the selected term in both the specification and the claims.

This functionality can also be used during navigation (described above). For example, as described above, the user navigates through claims terms by pressing a zero hits button 505. Upon receipt of such a command, the DDMT 202 jumps to the next claims term in the hit matrix 510 (the hit matrix 510 is typically a scroll window). In the split screen mode, the DDMT 202 commands the word processor 208 to locate and display the first claim containing the claims term in the second text window 1104 of the word processing window 304. The DDMT 202 also commands the word processor 208 to display the specification in the first text window 1102 of the word processing window 304

Differentiating the First and Second Document Portions by Font and Color

The invention preferably uses a first font when displaying text from the first portion of the document (for example, the specification) in the word processing window 304. Also, the invention preferably uses a second font when displaying text from the second portion of the document (for example, the claims) in the word processing window 304. This is the case, whether the word processing window 304 is in the single screen or split screen mode. Preferably, the first and second fonts are the same, except the second font is emphasized in some manner (such as being bold or italics). Such use of different fonts aids the user during navigation through the current document, as it visually indicates whether the user is viewing the first or the second portion of the current document. For example, assume that the split screen mode is being used, and specification text is being displayed in the first text window 1102, and claims text is being displayed in the second text window 1104. In this example, the text in the first text window 1102 is displayed using one font, and the text in the second text window 1104 is displayed using another font. Also, the first font may be one size, and the second font may be a second size.

Also, when navigating in the split screen mode (as described above), the GUI 203 emphasizes in some manner the terms in the specification and the claims as they appear in the word processing window 304. Preferably, one color is used when a term appears in the specification, and another color is used when a term appears in the claims. For example, when performing claims terms navigation in the split screen mode (as describe above), claims terms located in the specification are displayed in one color in the first text window 1102, and claims terms located in the claims are displayed in another color in the second text window 1104.

Such operation of the invention makes it easier for users to determine when they are viewing text from the first portion of the document and text from the second portion of the document.

Element Command

Figure 23:
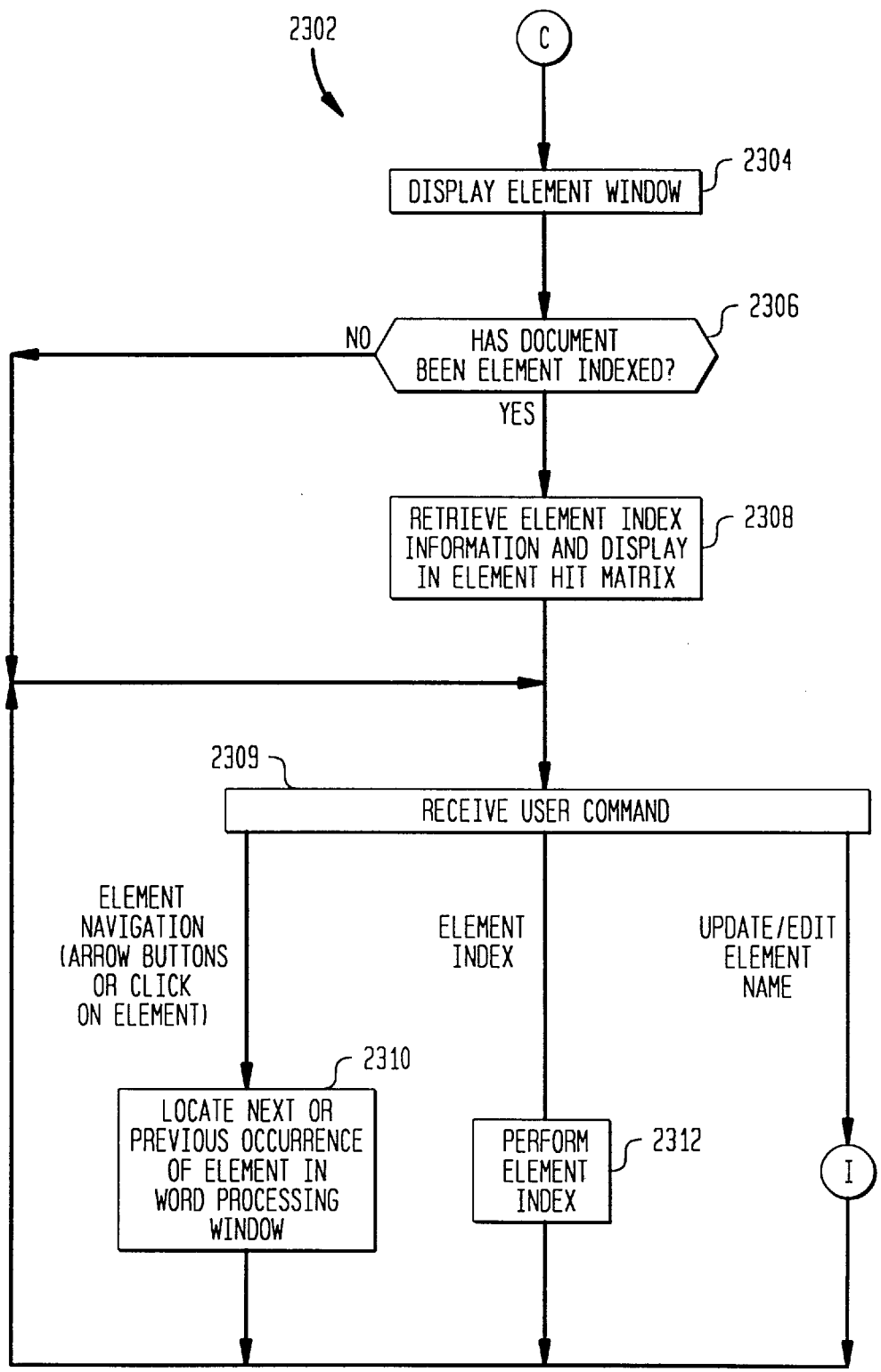

The operation of the DDMT 202 when processing the Element command shall now be described with reference to flowchart 2302 shown in FIG. 23.

In step 2304, the GUI 203 displays an element window 601 (FIG. 6) in the command area window 310 (FIG. 3).

Figure 24:
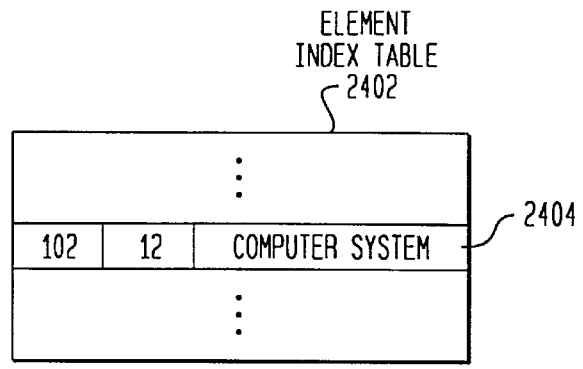

In step 2306, the DDMT 202 determines whether the reference numbers (also called element numbers) contained in the current document have been previously indexed. A reference number is preferably any term that begins with a digit, such as 102, 102A, 102ABC, etc. Preferably, the DDMT 202 performs step 2306 by determining whether an element index table 2402 such as that shown in FIG. 24 exists for the current document. Alternatively, the DDMT 202 performs step 2306 by reference to the master data file, as described above.

The element index table 2402 includes a row or record for each reference number. Each record identifies the reference number, the number of hits of the reference number contained in the current document, and the element name associated with the reference number.

If, in step 2306, it is determined that the current document has not been element indexed, then control flows to step 2309 (described below). Otherwise, step 2308 is performed.

In step 2308, the DDMT 202 retrieves index information from the element index table 2402 and displays such index information in an element hit matrix 602 of the element window 601. Step 2308 is preferably performed as follows. The DDMT 202 retrieves every record contained in the element index table 2402. For each record, the DDMT 202 displays the reference number in the Element (Elt) column of a row of the element hit matrix 602. The DDMT 202 also displays the number of hits in the Hits column, and the element name in the Element Name of the element index table 2402.

In step 2309, the GUI 203 receives a user command from the element window 601. Possible commands include element navigation, element index, and update/edit element name. These commands are discussed below.

Element Window—Element Navigation

Figure 6:
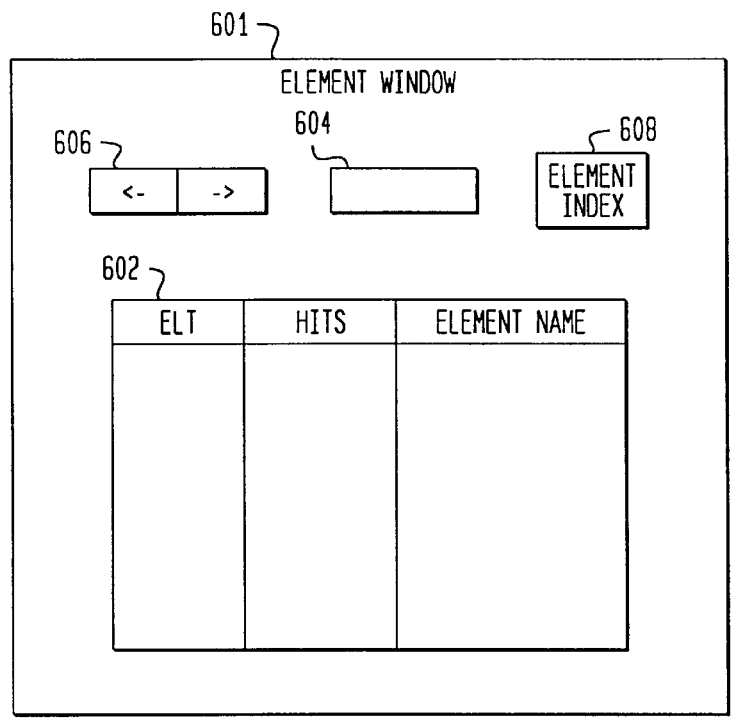

Referring to FIG. 6, the user selects the element navigation command by selecting a reference number in element hit matrix 602 (i.e., selecting a row in the element hit matrix 602), and then clicking on (or otherwise selecting) the arrow buttons 606. If the user clicks on the back arrow, then the DDMT 202 commands the word processor 208 to locate and display text surrounding the nearest previous occurrence of the selected reference. If the user clicks on the forward arrow, then the DDMT 202 commands the word processor 208 to locate and display text surrounding the next occurrence of the selected reference number.

The user can also double click on a reference number in the element hit table 602. Upon receipt of such a user command, the DDMT 202 commands the word processor 208 to locate the first occurrence of the selected reference number in the current document, and to display text surrounding this occurrence in the word processing window 304.

A navigation field 604 in the element window 601 keeps track of which hit is being viewed. For example, the element window 601 may display the following message: "6 of 25." This message indicates that hit 6 out of 25 hits of the element is currently being viewed in the word processing window 304.

The functionality described above is represented by step 2310 in FIG. 23.

Element Window—Element Index

Figure 25:
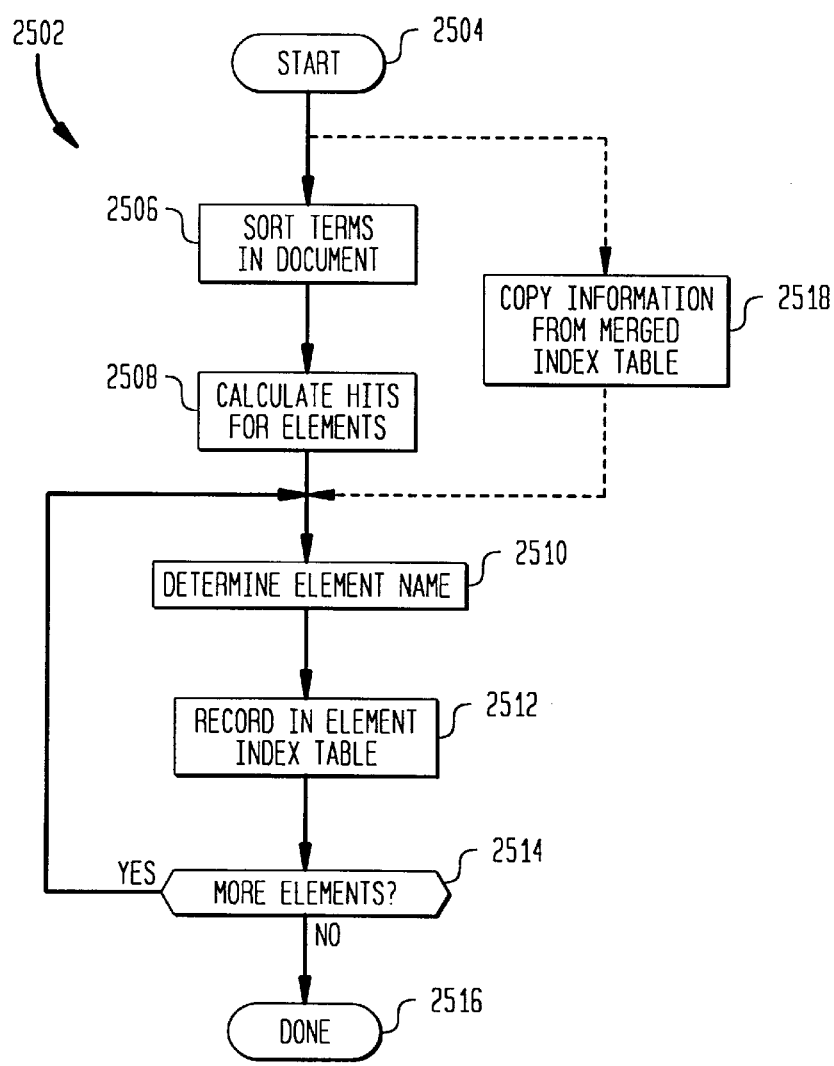

The user selects the element index command by pressing the Element Index button 608 in the Element window 601. Upon receipt of this command, the DDMT 202 performs element indexing (this is represented by step 2312 in FIG. 23). The manner in which the DDMT 202 performs element indexing shall now be described with reference to a flowchart 2502 in FIG. 25.

In step 2506, the DDMT 202 alphanumerically sorts the terms (including reference numbers) in the current document. The result of such sorting is shown, by way of example, in Table 1, above.

In step 2508, the DDMT 202 calculates the number of hits for each reference number by inspection of the sorted list generated in step 2506. The DDMT 202 stores this information in the element index table 2402. In particular, the DDMT 202 creates a record in the element index table 2402 for each reference number. The DDMT 202 then stores the reference number and the number of hits in the record corresponding to each reference number.

It is noted that the information determined in steps 2506 and 2508 is already contained in the merged index table 1002. Accordingly, in one embodiment of the invention the DDMT 202 performs step 2518 instead of steps 2506 and 2508. In step 2518, the DDMT 202 extracts from the merged index table 1002 all records pertaining to reference numbers, and copies this information in the element index table 2402. In this case, the hit count for each reference number is equal to the number of specification hits plus the number of claims hits. Typically, in U.S. patent applications, the hit count for the claims will be zero, since reference numbers are not used in the claims. The same is not true in patent applications of other countries, where reference numbers are used in the claims.

In step 2510, the DDMT 202 selects a reference number from the element index table 2402. The DDMT 202 then determines the element name of the selected reference number. In particular, the DDMT 202 commands the word processor 208 to search for the first occurrence of the selected reference number in the current document. The invention assumes that the two terms preceding each reference number is the element name corresponding to the reference number. Accordingly, the DDMT 202 extracts the two terms preceding the selected reference number, and stores these two terms in the row of the element index table 2402 corresponding to the selected reference number (step 2512).

For example, assume that the selected reference number is 102, and the first occurrence of reference number 102 in the current document is as follows:

"The graphics computer system 102 comprises multiple processors."

In this case, the DDMT 202 considers "computer system" to be the element name corresponding to reference number 102. Accordingly, the DDMT 202 stores "computer system" in the row of the element index table 2402 corresponding to reference number 102 (see row 2404 in the example element index table 2402 of FIG. 24). In other embodiments, the DDMT 202 assumes that the three terms preceding each reference number is the element name corresponding to the reference number, or the one term that immediately precedes each reference number is the element name corresponding to the reference number. The number of terms that constitute an element name may also be different values. Preferably, this is a user-selectable value (i.e., the number of terms that constitute an element name), which is stored with each document.

The DDMT 202 performs steps 2510 and 2512 for each reference number in the element index table 2402. In other words, the DDMT 202 determines the element name for each reference number in the element index table 2402. This is represented by step 2514.

Element Window—Update/Edit Element Name

Figure 26:
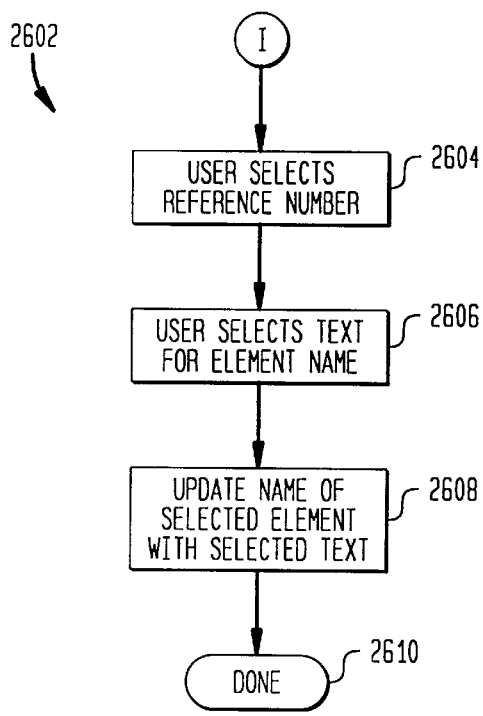

As discussed above, the DDMT 202 assumes that the two terms preceding each reference number is the element name corresponding to the reference number. This convention may be true for most reference numbers, but may be incorrect for other reference numbers. Accordingly, the present invention allows users to modify the elements names of reference numbers. This function is called Update/Edit Element Name. This function shall now be described with reference to a flowchart 2602 in FIG. 26.

In step 2602, the user selects a reference number from the element hit table 602 of the element window 601. The user does this using any well known selection method, such as double clicking on the row of the element hit matrix 602 corresponding to the reference number. As discussed above with reference to the Element Navigation command, the DDMT 202 responds to such user action by commanding the word processor 208 to locate and display text surrounding the first occurrence of the selected reference number.

This occurrence of the reference number may or may not include the text which the user wishes to use as the element name. The user navigates through the current document using the arrow keys 606 (as describe above) until the desired occurrence of the reference number is found.

Step 2606 is performed after the desired occurrence of the reference number is found. In step 2606, the user selects text in the word processing window 304 that he/she wishes to use as the element name for the selected reference number. Typically, this text is immediately prior to the selected reference number, but can be any text in the current document (the invention also allows the user to key in text for use as the element name).

In step 2608, the DDMT 202 copies the selected text to the record of the element index table 2402 corresponding to the selected reference number. The GUI 203 also displays the selected text in the Element Name column of the row of the element hit matrix 602 corresponding to the selected reference number. The user initiates this operation of step 2608 by clicking on the Element Name column of the row in the element hit matrix 602 for the reference number being processed.

Report Command

Figure 27:
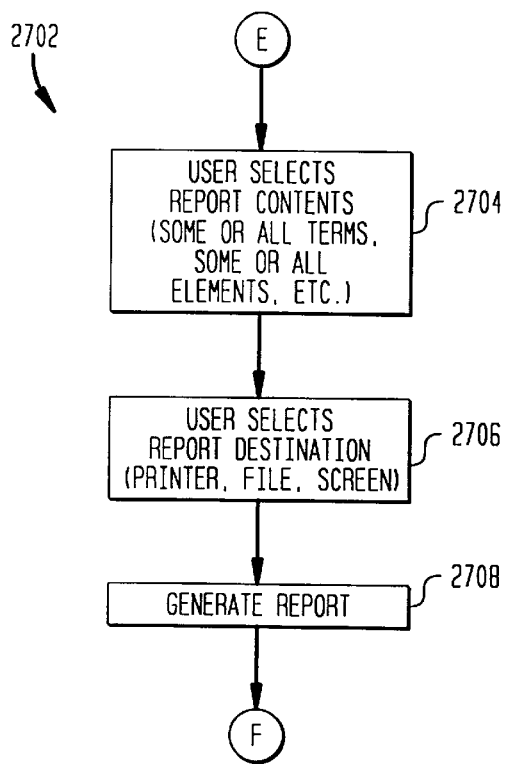

The operation of the DDMT 202 when processing the Report command shall now be described with reference to flowchart 2702 shown in FIG. 27.

In step 2704, the GUI 203 enables the user to select the report contents (i.e., the content of the report that is to be generated). Reports may include portions or all of the merged index table 1002, portions or all of the element index table 2402, etc.

In step 2706, the GUI 203 enables the user to select the report destination (file, printer, screen, etc.).

The GUI 203 also allows the user to print preview the report.

In step 2708, the GUI 203 generates the report. The GUI 203 sends the report to the selected destination. The report includes the information selected by the user in step 2704.

Status Command

Figure 28:
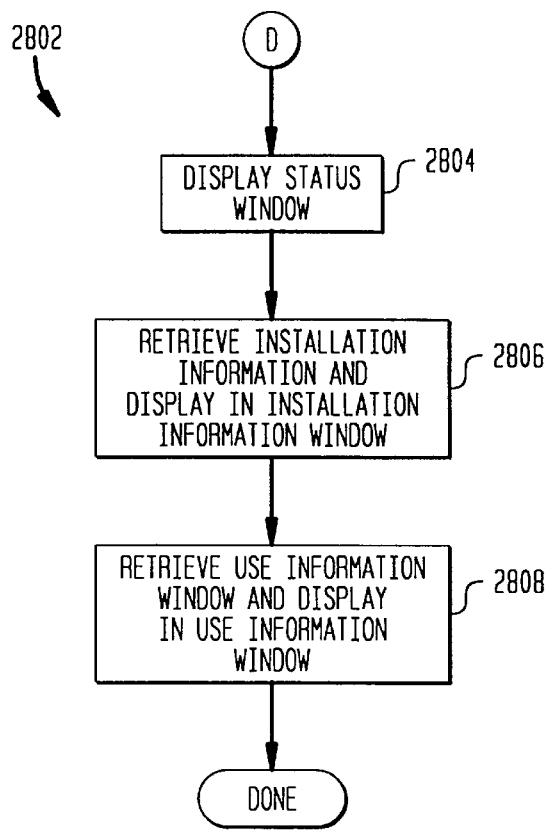

The operation of the DDMT 202 when processing the Status/Statistics command shall now be described with reference to flowchart 2802 shown in FIG. 28.

Figure 29:
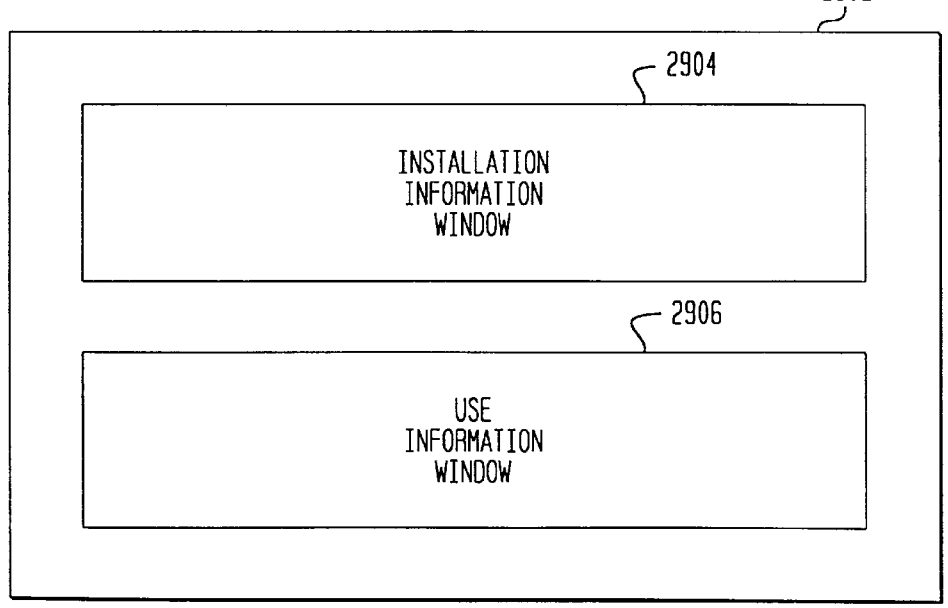

In step 2804, the GUI 203 displays a status window 2902 (FIG. 29) in the command area window 310.

In step 2806, the DDMT 202 retrieves installation information from an installation file stored in the secondary memory 110. The installation information includes the registered owner and company of the DDMT 202 software, the date of installation, and other information pertaining to the installation of the DDMT 202 software. Also in step 2806, the GUI 203 displays the retrieved installation information in an installation window 2904 of the status window 2902.

In step 2808, the DDMT 202 retrieves use information from a use file stored in the secondary memory 110. The use information includes the number of documents that the DDMT 202 has been used with, the date of the last change to each document, the drafter of each document, etc. Also in step 2808, the GUI 203 displays the use information in an use information window 2906 contained in the status window 2902.

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for comparing text portions, comprising the steps of:
   (1) indexing a first selected non-predefined text portion to generate first index information;
   (2) indexing a second selected non-predefined text portion to generate second index information; and
   (3) comparing said first and second index information generated in steps (1) and (2).

2. The method of claim 1, further comprising the step of:
   (4) identifying differences between said first and second text portions by reference to results of said comparison performed in step (3).

3. The method of claim 1, further comprising the step of:
   (4) identifying similarities between said first and second text portions by reference to results of said comparison performed in step (3).

4. The method of claim 1, wherein step (1) results in generating a first index table, and step (2) results in generating a second index table.

5. The method of claim 4, further comprising the step of:
   merging said first and second index tables to thereby generate a merged index table.

6. The method of claim 5, wherein step (3) comprises the step of:
   determining by reference to said merged index table terms that are present in said second text portion, but not present in said first text portion.

7. The method of claim 4, wherein said first text portion and said second text portion are from the same document.

8. A system for comparing text portions, comprising:
   first text portion indexing means for indexing a first selected non-predefined text portion to generate first index information;
   second text portion indexing means for indexing a second selected non-predefined text portion to generate second index information; and
   index comparing means for comparing said first and second index information generated by said first and second text portion indexing means.

9. The system of claim 8, further comprising:
   means for identifying differences between said first and second text portions by reference to results of said comparison performed by said index comparing means.

10. The system of claim 8, further comprising:

means for identifying similarities between said first and second text portions by reference to results of said comparison performed by said index comparing means.

11. The system of claim 8, wherein said first text portion indexing means generates a first index table, and said second text portion indexing means generates a second index table.

12. The system of claim 11, further comprising:

means for merging said first and second index tables to thereby generate a merged index table.

13. The system of claim 12, wherein said index comparing means comprises:

means for determining by reference to said merged index table terms that are present in said second text portion, but not present in said first text portion.

14. The system of claim 8, wherein said first text portion and said second text portion are from the same document.

15. A computer program product having control logic stored therein, said control logic, when executed, enabling a computer to compare text portions, said control logic comprising:

first text portion indexing means for enabling the computer to index a first selected non-predefined text portion to generate first index information;

second text portion indexing means for enabling the computer to index a second selected non-predefined text portion to generate second index information; and index comparing means for enabling the computer to compare said first and second index information generated by said first and second text portion indexing means.

16. The computer program product of claim 15, said control logic further comprising:

means for enabling the computer to identify differences between said first and second text portions by reference to results of said comparison performed by said index comparing means.

17. The computer program product of claim 15, said control logic further comprising:

means for enabling the computer to identify similarities between said first and second text portions by reference to results of said comparison performed by said index comparing means.

18. The computer program product of claim 15, wherein said first text portion indexing means enables the computer to generate a first index table, and said second text portion indexing means enables the computer to generate a second index table.

19. The computer program product of claim 18, said control logic further comprising:

means for enabling the computer to merge said first and second index tables to thereby generate a merged index table.

20. The computer program product of claim 19, wherein said index comparing means comprises:

means for enabling the computer to determine by reference to said merged index table terms that are present in said second text portion, but not present in said first text portion.

21. The computer program product of claim 15, wherein said first text portion and said second text portion are from the same document.

\* \* \* \* \*

UNITED STATES PATENT AND TRADEMARK OFFICE
CERTIFICATE OF CORRECTION

PATENT NO. : 6,014,663
DATED : January 11, 2000
INVENTOR(S) : Rivette et al.

It is certified that error appears in the above-identified patent and that said Letters Patent is hereby corrected as shown below:

In the section entitled "Other Publications", in section [56] on the title page, please insert the following citation:

-- "Automated Patent System Refresher Training Course", USPTO, December, 1995.--

Signed and Sealed this

Seventh Day of August, 2001

*Attest:*

*Attesting Officer*

NICHOLAS P. GODICI
*Acting Director of the United States Patent and Trademark Office*